(12) United States Patent
Paterson et al.

(10) Patent No.: US 8,459,017 B2
(45) Date of Patent: Jun. 11, 2013

(54) LOW PRESSURE DROP MIXER FOR RADIAL MIXING OF INTERNAL COMBUSTION ENGINE EXHAUST FLOWS, COMBUSTOR INCORPORATING SAME, AND METHODS OF MIXING

(75) Inventors: Clark Paterson, Loveland, CO (US); Dan B. Mastbergen, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 420 days.

(21) Appl. No.: 12/415,146

(22) Filed: Mar. 31, 2009

(65) Prior Publication Data
US 2009/0255242 A1    Oct. 15, 2009

Related U.S. Application Data

(60) Provisional application No. 61/043,533, filed on Apr. 9, 2008.

(51) Int. Cl.
*F01N 3/00*    (2006.01)

(52) U.S. Cl.
USPC ............... 60/324; 60/286; 60/262; 138/38

(58) Field of Classification Search
USPC .................. 60/274, 284–287, 295–301
See application file for complete search history.

(56) References Cited

U.S. PATENT DOCUMENTS

| | | | |
|---|---|---|---|
| 1,015,831 A * | 1/1912 | Pielock et al. | 138/38 |
| 1,113,041 A * | 10/1914 | Murphy | 48/189.4 |
| 3,051,452 A * | 8/1962 | Nobel | 366/337 |
| 3,285,709 A | 11/1966 | Ennarino et al. | |
| 3,802,668 A * | 4/1974 | Charles-Messance | 425/197 |
| 4,165,609 A * | 8/1979 | Rudolph | 60/262 |
| 4,208,136 A * | 6/1980 | King | 366/338 |
| 4,463,742 A * | 8/1984 | Williams | 123/590 |
| 4,538,413 A | 9/1985 | Shinzawa et al. | |
| 4,541,239 A | 9/1985 | Tokura et al. | |
| 4,651,524 A | 3/1987 | Brighton | |
| 4,673,423 A * | 6/1987 | Yumlu | 55/319 |
| 4,951,464 A | 8/1990 | Eickhoff et al. | |
| 5,001,899 A | 3/1991 | Santiago et al. | |
| 5,049,063 A | 9/1991 | Kishida et al. | |
| 5,826,428 A | 10/1998 | Blaschke | |
| 6,095,793 A | 8/2000 | Greeb | |

(Continued)

FOREIGN PATENT DOCUMENTS

| CN | 2105560 U | 5/1992 |
|---|---|---|
| CN | 1130715 A | 9/1996 |

*Primary Examiner* — Thomas Denion
*Assistant Examiner* — Jesse Bogue
(74) *Attorney, Agent, or Firm* — Reinhart Boerner Van Deuren P.C.

(57) ABSTRACT

An exhaust aftertreatment system is provided. The exhaust aftertreatment system includes a mixing arrangement for mixing flows of exhaust along a flow path. The mixing arrangement radially and angularly rearranges segments of two different portions of flow to mix the different portions of flow. The mixing arrangement initially converts a generally radially stratified temperature profile into an angularly stratified temperature profile to increase surface area between cool segments of exhaust gas and hot segments of exhaust gas. The aftertreatment system may also include a combustion chamber, a combustor housing and a combustor liner. The mixing arrangement is downstream from the combustion chamber to direct radially outward hot gas passing through the combustor liner and to direct radially outer cool gas passing between the liner and the combustor housing radially inward in an interleaving fashion.

28 Claims, 12 Drawing Sheets

U.S. PATENT DOCUMENTS

| | | | |
|---|---|---|---|
| RE36,969 E * | 11/2000 | Streiff et al. | 366/173.1 |
| 6,314,721 B1 * | 11/2001 | Mathews et al. | 60/264 |
| 6,547,433 B2 * | 4/2003 | Yazici et al. | 366/336 |
| 6,615,872 B2 * | 9/2003 | Goebel et al. | 138/38 |
| 6,623,155 B1 * | 9/2003 | Baron | 366/181.5 |
| 6,742,331 B2 * | 6/2004 | Minami | 60/287 |
| 7,025,810 B2 * | 4/2006 | Crawley et al. | 95/278 |
| 7,243,489 B2 | 7/2007 | Johnson et al. | |
| 7,281,530 B2 | 10/2007 | Usui | |
| 7,793,494 B2 * | 9/2010 | Wirth et al. | 60/324 |
| 2002/0110047 A1 * | 8/2002 | Bruck et al. | 366/340 |
| 2005/0150211 A1 | 7/2005 | Crawley et al. | |
| 2005/0229585 A1 * | 10/2005 | Webster | 60/226.1 |
| 2006/0218902 A1 | 10/2006 | Arellano et al. | |
| 2007/0000242 A1 | 1/2007 | Harmon et al. | |
| 2007/0119985 A1 | 5/2007 | Ranganathan et al. | |
| 2007/0240406 A1 | 10/2007 | Zhang et al. | |
| 2008/0307780 A1 * | 12/2008 | Iverson et al. | 60/311 |

* cited by examiner

LOW PRESSURE DROP MIXER FOR RADIAL MIXING OF INTERNAL COMBUSTION ENGINE EXHAUST FLOWS, COMBUSTOR INCORPORATING SAME, AND METHODS OF MIXING

CROSS-REFERENCE TO RELATED PATENT APPLICATION

This patent application claims the benefit of U.S. Provisional Patent Application No. 61/043,533, filed Apr. 9, 2008, the entire teachings and disclosure of which are incorporated herein by reference thereto.

FIELD OF THE INVENTION

This invention generally relates to diesel engine exhaust systems and more particularly mixers for aftertreatment devices for diesel engine exhaust systems.

BACKGROUND OF THE INVENTION

Increasing environmental restrictions and regulations are causing diesel engine manufacturers and packagers to develop technologies that improve and reduce the impact that operation of such engines have on the environment. As a result, much design work has gone into the controls that operate the combustion process within the engine itself in an attempt to increase fuel economy and reduce emissions such as $NO_x$ and particulates. However, given the operating variables and parameters over which a diesel engine operates and given the tradeoff between $NO_x$ and particulate generation, many engine manufacturers and packagers have found it useful or necessary to apply exhaust aftertreatment devices to their systems. These aftertreatment devices are used to filter or catalytically refine the exhaust gas flow from the diesel engine to remove or reduce to acceptable levels certain engine exhaust emissions and typically have specific thermal operational requirements in order to function effectively.

One such exhaust aftertreatment device is called a Diesel Particulate Filter (DPF). The DPF is positioned in the engine exhaust system such that all exhaust gases from the diesel engine flow through it. The DPF is configured so that the soot particles in the exhaust gas are deposited in the filter substrate of the DPF. In this way, the soot particulates are filtered out of the exhaust gas so that the engine or engine system can meet or exceed the environmental regulations that apply thereto.

While such devices provide a significant environmental benefit, as with any filter, problems may occur as the DPF continues to accumulate these particulates. After a period of time, the DPF filter substrate becomes sufficiently loaded with soot causing the exhaust gases to experience a significant pressure drop passing through the increasingly restrictive DPF. As a result of operating with an overly restrictive DPF, the engine thermal efficiency declines due to the fact that the engine must work harder and harder simply to pump the exhaust gases through the loaded DPF. This loss of engine performance, due to increased restriction in the exhaust system, continues to grow more severe with continued engine operation and DPF soot accumulation, eventually culminating in engine failure or engine shutdown.

To avoid such an occurrence, the engine packager typically incorporates one of several possible filter heating devices upstream of the DPF to periodically clean the filter of the accumulated soot. These filter heating devices are used periodically to artificially raise the temperature of the exhaust stream entering the DPF to a point at which the accumulated soot will oxidize and burn using the residual oxygen in the exhaust stream. When initiated at a time before loading of the DPF becomes excessive, the ignition and burn off of the trapped particulate matter will occur in a safe and controlled fashion. This process of burning the soot from the DPF filter substrate in such a controlled manner is called regeneration. One important parameter of a DPF regeneration is the temperature uniformity going into the DPF during the regeneration event. Localized areas of the DPF that are warmer or cooler than the targeted regeneration temperature can decrease the effectiveness of the regeneration event. Warmer areas may cause filter damage through thermal gradients or accelerated soot oxidation while cooler areas may result in areas of the filter that are not cleaned of soot.

Other engine exhaust aftertreatment devices include Diesel Oxidation Catalysts (DOC), Urea-Selective Catalytic Reduction systems (SCR), Lean-NOx traps, and many others. Many of these devices rely on catalytic reactions occurring with chemicals or exhaust emissions on a substrate surface. Some of these devices incorporate injections of chemicals into the exhaust stream upstream of the substrate. Temperature and chemical uniformity of the flows entering these devices is critical to efficient operation of these devices. Use of the expensive catalysts on the substrate surface is maximized when the entire substrate experiences uniform temperature and chemical mixtures within the desire range. Areas of the substrate that experience flows outside of the target temperature or chemical composition will degrade performance of the aftertreatment system.

Typically a DOC must operate above temperatures of approximately 350 C and an SCR system must operate above temperatures of approximately 300 C. Operation of either of these systems in temperatures lower than specified results in decreased performance and efficiency of the system. Lean-NOx traps also have temperature limitations but further have the requirement of specific oxygen concentrations at periodic intervals. In order for a Lean-NOx trap to operate and purge its catalytic surface of accumulated NOx, exhaust with low oxygen and high hydrocarbon content must be passed through the substrate. This is an added requirement of the system.

As previously discussed many diesel exhaust aftertreatment devices have characteristic operation temperature and sometimes species composition requirements. A difficulty with these systems is that the engine exhaust may not be of sufficient temperature or composition at all times to maintain operation of these devices. Many methods have been devised to provide the auxiliary heat or species concentrations necessary for proper aftertreatment device operation. For example, the operating parameters of the diesel engine may be modified in such a manner to cause the exhaust temperature to rise to a level sufficient for proper operation of the devices. It is also possible to inject hydrocarbon fuel into the exhaust of a diesel engine immediately before the exhaust passes through a Diesel Oxidation Catalyst (DOC). The DOC converts the excess hydrocarbon fuel in the exhaust stream into heat by means of the catalytic reaction of exhaust oxygen with hydrocarbons on the catalyst, thus increasing the exhaust gas temperature prior to its passage through other aftertreatment devices. However, as previously mentioned, the DOC has its own temperature limitations and heat addition may be required prior to the DOC to insure proper operation. Supplemental heat may also be generated in the exhaust flow by use of an auxiliary electrical heater placed within the exhaust path. This supplemental heat is added to the exhaust gas prior to its passage through the aftertreatment devices. As an alternative to the use of an electric heater, another method of filter regeneration uses a fuel-fired burner or combustor to heat the exhaust gas.

The challenge when using a fuel-fired burner to perform this heat addition is to create a combustor that will raise the temperature of exhaust gasses while meeting criteria for light-off performance, combustion stability, emissions, and exhaust pressure loss. Additionally, it may be necessary to operate the fuel-fired burner in a mode that reduces the remaining engine exhaust oxygen content while supplying excess hydrocarbons subject to the above requirements. Both of these combustor operational modes have challenges when operating in the diesel exhaust environment. Specifically, the operational conditions in the diesel engine exhaust system differ severely from other operating environments where combustors are used, e.g. in gas turbine engines. As such, the combustor must operate over a wide range of exhaust flow rates, temperatures, and oxygen concentrations. In the diesel exhaust stream, oxygen concentrations can range from approximately 3 to 19% by mass and other diluents such as $CO_2$ and $H_2O$ may be present in large quantities. As the diesel engine is operated through various conditional states, the composition and temperature of the engine exhaust which is use as the oxidizer in the combustor can change greatly in magnitude as well as in a very short time. These changes in the oxidizer supplied to the exhaust system combustor create a difficult environment for stable, sustained combustion that meets the above described requirements.

As a result of the difficult combustion requirements demanded of a combustor that operates in an engine exhaust system, new designs and innovations in the area of combustor systems are required. It has been established that combustors that utilize multiple stages for the combustion process can be beneficial for this application. U.S. Pat. No. 4,951,464 by Eickhoff et al., teaches that a fuel rich mixture can be partially combusted in an isolated "Primary" combustion chamber with the remaining fuel being later oxidized in a subsequent combustion chamber with the addition of engine exhaust gases to provide oxygen to complete the combustion of the remaining fuel. However, the combustor design as described in Eickhoff is deficient due to the design's inability to control the amount of engine exhaust that is introduced to combust the remaining fuel. Addition of too little engine exhaust to complete combustion of the fuel will result in an incomplete reaction resulting in elevated hydrocarbon emissions from the device. Addition of too much engine exhaust to combustion reaction for the residual fuel will cause combustion quenching, again resulting in elevated hydrocarbon emissions.

A further typical requirement of some aftertreatment devices is for uniform temperature distribution entering the device. Typical average temperature requirements of aftertreatment devices are also typically much lower than the burner combustion temperatures. Because of the need to lower the combustion temperatures to acceptable levels, all or a portion of the engine exhaust is often diverted from the combustion process and used to cool the products of the combustion event. This recombination of hot and relatively cool gasses presents significant challenges when trying to meet temperature uniformity requirements for the aftertreatment devices located downstream of the combustor. Typical combustor designs have a combustion region near a center axis of the combustor assembly and divert engine exhaust into an annular passage around the combustor resulting in an output temperature profile that is characteristically hot in the center and cooler towards the outside. U.S. Pat. No. 4,651,524 by Brighton teaches such a typical combustor assembly. Additionally, a flame arrestor device such as that disclosed by Brighton may excessively restrict the flows of the combustor device and have stringent material requirements due the high temperatures typical of the operation of such a device.

U.S. Pat. No. 4,538,413 by Shinzawa et al., and U.S. Pat. No. 4,541,239 by Tokura, et al., both teach the concept of diverting all or a portion of the engine exhaust around the combustion event. The bypassed engine exhaust products then must pass through holes or openings in a combustion liner or other device to be mixed with the products of the combustion before exiting the combustor. This approach is disadvantageous due to inherent requirement of the mixing mechanism on pressure drop across the openings or holes. This type of mixing device requires jets of the cooler exhaust to be formed to rapidly mix the exhaust with the combustion product. The mixing effectiveness is dependent on the kinetic energy of the jets which is a direct result of the pressure drop across the openings where the jets are formed. A complication of the application of such devices to engines is that the engines typically have a very wide exhaust flow range. The wide range of flows through the combustor device result in a wide range of flows across these openings and thus a wide range of pressure drops across the openings. Therefore, jet style mixers typically have inefficiencies that cannot be fully mitigated. Low flows do not produce sufficient pressure loss across the mixer to provide high energy jets, resulting in poor mixing. High flows produce excessive pressure loss across the mixer at high flows resulting in system inefficiencies and increased engine fuel consumption due to excessive backpressure on the engine.

BRIEF SUMMARY OF THE INVENTION

Embodiments of the invention provide new and improved apparatuses and method of mixing exhaust gases flowing from an internal combustion engine. The new and improved apparatuses and methods provide for low pressure drop mixing by separating an upstream flow into a plurality of segments and then rearranging the segments in a new orientation downstream. Embodiments of the new and improved methods and apparatuses adjust a temperature profile of the exhaust flow from being generally radially stratified to being angularly stratified to increase surface area and interactions between the segments of exhaust flow. Further, embodiments of the present invention relates to directing the exhaust flows rather than relying strictly on forcing the fluid through holes forming radially directed jets. As such, embodiments of the present invention work at a significantly larger range of flow rates as well as under reduced pressure drop. In other words, to effectuate the rearrangement of the flows, there is no need to create a high pressure upstream of a plurality of jet forming apertures so as to highly accelerate the fluid so as to form a radially inward directed jet, such as in other mixing arrangements.

Accordingly, on one particular implementation of the invention, a method of mixing a flow of exhaust flowing along a flow axis is provided. The method generally includes rearranging the flow of exhaust along the flow axis. Rearranging the flow of exhaust includes directing a first portion of the flow radially outward away from the flow axis and directing a second portion of the flow radially inward toward the flow axis. The steps of directing the first and second portions includes separating the first portion into a plurality of first segments and directing the first segments radially outward and separating the second portion into a plurality of second segments and directing the second segments radially inward, wherein the step of rearranging includes increasing the surface area between the first and second portions.

In one implementation, the first segments are a plurality of first angular segments and the second segments are a plurality of second angular segments, the exhaust flow being formed by generally alternating first and second angular segments after the step of rearranging. As such, the exhaust flow may have a temperature profile that is originally radially stratified having high temperatures at the radially inner flow (first portion) and having lower temperatures at the radially outer flow (second portion), relative to the inner flow, prior to the step of rearranging. However, after the step of rearranging, the temperature profile of the exhaust flow is substantially angularly stratified by the alternating first and second angular segments of high and low temperatures relative to one another.

In a more specific implementation, the method may include changing a cross-sectional shape of the first segments of the first portion of the flow and changing the cross-sectional shape of the second segments of the second portion of the flow. In a preferred implementation of this embodiment, the change in cross-sectional shape occurs while maintaining a cross-sectional area of the first and second portions of the flow so as to avoid compression of the two flow portions resulting in undesired pressure drop during the rearranging process.

In a further implementation, the steps of directing the first and second portions of the flow includes changing the radial distribution of the first portion of the flow relative to the second portion such that the first portion of the flow has a first mean distance from the flow axis prior to the step of rearranging and the first portion of flow has a second mean distance from the flow axis after the step of rearranging, the second mean distance being greater than the first mean distance and wherein the second portion of the flow has a third mean distance from the flow axis prior to the step of rearranging and the first portion of flow has a fourth mean distance from the flow axis after the step of rearranging, the fourth mean distance being less than the third mean distance.

In some implementations of the methods according to the present invention, the hot central exhaust flow is not directly directed radially outward, but is indirectly directed radially outward by drawing the hot exhaust flow outward due, primarily, to direct directing of the cool radially outer exhaust flow radially inward. This avoids directly impinging high temperature exhaust flow onto portions of a mixing arrangement.

A new and improved exhaust gas mixer for interleaving portions of a flow of exhaust gas from an internal combustion engine is also provided. The new and improved exhaust gas mixer has a low pressure drop and due to its configuration can be easily initially designed to effectuate highly tuned mixing of an exhaust flow depending on the cross-sectional profile of the exhaust flow. The exhaust gas mixer generally includes, a plurality of first flow directing tabs and a plurality of second flow directing tabs. The first and second flow directing tabs are arranged to circumscribe a flow axis. The first flow directing tabs arranged and configured to direct radially inward exhaust flow radially outward and the second flow directing tabs arranged to direct radially outer exhaust flow radially inward. This mixer arrangement causes segments of the hot central core of an exhaust flow to be interleaved with segments of the cool annular periphery of the exhaust flow.

In a preferred implementation, the first flow directing tabs have an upstream inlet end and a downstream outlet end. The second flow directing tabs have an upstream inlet end and a downstream outlet end. The inlet ends of the first flow directing tabs are radially inward of the outlet ends of the first flow directing tabs. The inlet ends of the second flow directing tabs are radially outward of the outlet ends of the first flow directing tabs. The inlet ends of the first flow directing tabs are radially inward of the inlet ends of the second flow directing tabs. The outlet ends of the first flow directing tabs are radially outward of the outlet tends of the second flow directing tabs and the inlet ends of the first flow directing tabs. The inlet end of the plurality of first flow directing tabs may be narrower than the downstream outlet end and the inlet end of the plurality of second flow directing tabs may be wider than the downstream outlet end.

In a further implementation of the mixing arrangement, each of the first and second flow directing tabs have an upstream surface facing upstream. The upstream surface of the first flow directing tabs is concave from the inlet end to the outlet end such that an angle between a tangent of the upstream surface and the flow axis increases in magnitude when moving in a direction from the inlet end toward the outlet end. Tithe upstream surface of the second flow directing tabs is concave from the inlet end to the outlet end such that an angle between a tangent of the upstream surface and the flow axis increases in magnitude when moving in a direction from the inlet end toward the outlet end. The concave nature provides a smooth transition for the various segments of the exhaust flow to transition from flowing substantially tangent to the flow path, i.e. parallel to the flow path, to flowing skewed to the flow path without significant turbulence and reduced pressure drop.

As such, in one more preferred implementation, the angle between the upstream surface of the first flow directing tabs and flow axis proximate the inlet end is between about zero (0) and twenty (20) degrees and the angle between the tangent and the upstream surface of the first flow directing tab proximate the outlet end is between about thirty (30) and seventy (65 degrees). The angle between the upstream surface of the second flow directing tabs and flow axis proximate the inlet end is between about zero (0) and twenty (20) degrees and the angle between the tangent and the upstream surface of the second flow directing tabs proximate the outlet end is between about thirty (30) and seventy (70) degrees.

In one implementation, the upstream surface of the first flow directing tabs faces radially outward and the upstream surface of the second flow directing tabs faces radially inward. Each of the first flow directing tabs are scoop shaped including a trough bottom and two generally radially extending sidewalls extending outward from the trough bottom and radially outward. Each of the second flow directing tabs are scoop shaped including a trough bottom and two generally radially extending sidewalls extending outward from the trough bottom and radially inward. The scoop-shaped tabs provides more aggressive catching and redirection of the different portions of the exhaust flow and prevents the exhaust from flowing laterally, i.e. angularly, off of the upstream faces of the flow directing tabs.

In a further implementation of the invention, a diesel fuel exhaust aftertreatment system for treating diesel fuel exhaust from an internal combustion engine is provided. The aftertreatment system includes a heat generating device for heating the exhaust generating a generally radially stratified temperature profile. The system also includes a mixing arrangement downstream from the heat generating device that includes a plurality of first flow directing tabs configured to direct a radially inward portion of the exhaust flow radially outward and a plurality of second flow directing tabs configured to direct a radially outer portion of the exhaust flow radially inward.

An a more preferred implementation, the aftertreatment system further includes a combustor housing, a combustor liner, an annulus located between the combustor housing and the combustor lining. The combustor liner is disposed within the combustor housing with the radially inward portion of the exhaust flow passes through the combustor liner and the radially outer portion of the exhaust flow flowing through the annulus. The first flow directing tabs draw the radially inward portion of the exhaust passing through the combustor liner radially outward toward the inner surface of the combustor housing and the second flow directing tabs direct the radially outward portion of the exhaust passing through the annulus radially inward, such that the mixer arrangement is configured to form a plurality of angularly stratified segments formed from alternating segments of the inward portion of the exhaust and the outward portion of the exhaust. This arrangement improves surface area interactions between the inward and outward portions of the exhaust to promote increased mixing and heat transfer therebetween to promote more rapid temperature distribution across the entire cross-section of the exhaust flow.

As such, in one implementation, the temperature profile, taken perpendicular to the flow path, of the exhaust passing through the annulus and the combustor liner upstream of the mixer arrangement is generally radially stratified having high temperatures at the radially inner flow and having lower temperatures at the radially outer flow, relative to the inner flow. The temperature profile, taken perpendicular to the flow path, of the exhaust downstream of the mixing arrangement is generally angularly stratified having alternating high and low temperature portions, respectively. The high temperature portions (high and low are used in relative terms) are substantially formed by high temperature exhaust that has been radially outwardly directed by the first flow directing tabs and are substantially aligned with the first flow directing tabs and the low temperature portions are substantially formed by low temperature exhaust that has been radially inwardly directed by the second flow directing tabs and are substantially aligned with the second flow directing tabs.

In preferred implementations, the first flow directing tabs have an inlet end that is radially outward of the inner liner and an outlet end that is radially inward of the inner liner. However, as the first flow directing tabs directly direct cool radially outer exhaust gas inward, the cool exhaust gas forms a buffer preventing the hot inner portion of the exhaust gas from directly impinging on the portion of the first flow directing tabs that extends radially inward beyond the inner liner thereby reducing heat transfer to the first flow directing tabs so as to protect the tabs from heat induced failure.

As the temperature profile upstream of the mixing arrangement may not be perfectly symmetrical about a flow axis, in some embodiments, at least one of the first flow directing tabs may be configured differently than another one of the first flow directing tabs and at least one of the second flow directing tabs is configured differently than another one of the second flow directing tabs. This provides the benefit of being able to more accurately tune the mixing arrangement to direct hot and cool exhaust flows to desired locations to more rapidly equalize the temperatures across the entire cross-sectional area of the exhaust flow. Further, yet in some implementations, this may be used to tune the mixing arrangement to generate a non-uniform temperature profile, but a temperature profile that is desired, such as a slightly inverted radially stratified temperature profile where the outer portion of the temperature profile is higher than a radially inner portion of the temperature profile. This can be beneficial due to operating parameters of downstream systems.

If it is desired to have more aggressive flow directing tabs, the flow directing tabs can be scoop shaped being both radially concave and angularly concave.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

As briefly discussed above and as a matter of context for the discussion of embodiments of the present invention, a DPF is installed in the exhaust flow path of a diesel engine before or upstream of an exhaust outlet to filter out particulates from the diesel engine exhaust. In order to clean the collected particulates, e.g. soot, off of the DPF, a combustor may be used upstream of the DPF but downstream from the exhaust inlet from the engine. The engine exhaust gases flow through openings of the combustor and through the DPF before exiting into the environment via the exhaust outlet.

In a typical fuel fired combustor fuel and air are supplied via a fuel valve and an air valve, e.g. such as electrically controlled solenoid valves. The fuel and air mixture is then ignited by one or more spark plugs positioned therein. An ignition controller may be able to communicate with the engine management system (EMS), and may receive various engine and system operating parameters, such as from an engine speed sensor, a throttle position sensor, a back pressure sensor, etc. The ignition controller also receives exhaust temperature input from sensors positioned to sense the temperature at different locations throughout the system.

Figure 1:
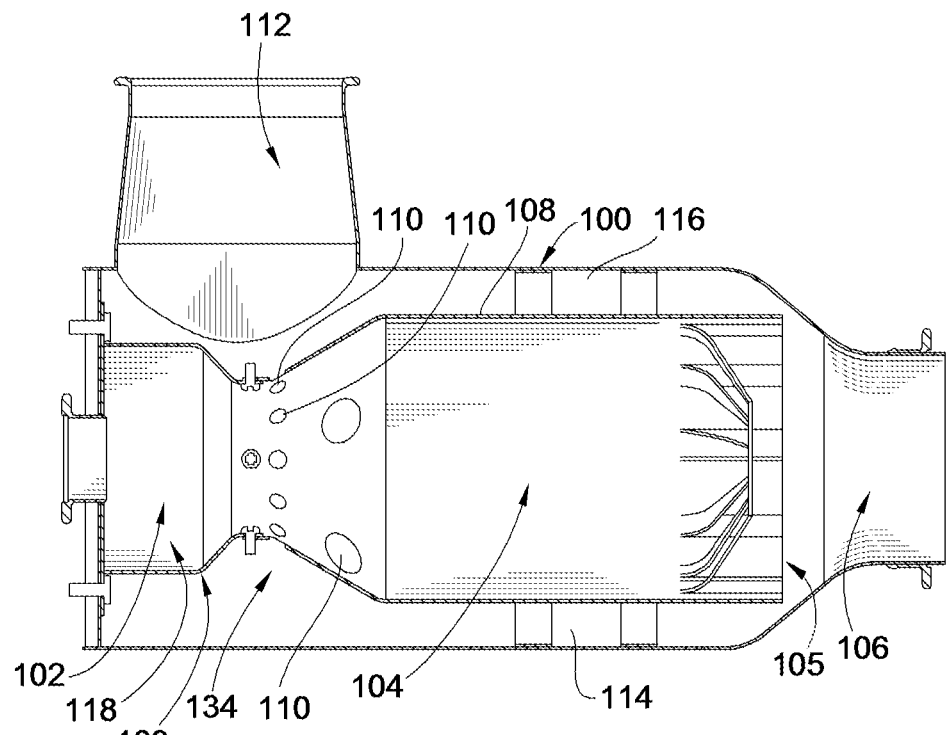
FIG. 1 is a simplified side section view of an embodiment of a combustor constructed in accordance with the teachings of the present invention positioned in a diesel engine exhaust flow path upstream of a diesel particulate filter (DPF)

Turning now specifically to the drawings, there is illustrated in FIG. 1 a simplified illustration of an embodiment of a combustor system 100. This simplified illustration does not include many of the elements of the combustor, e.g. fuel injector, ignition source, sensors, etc., for ease of illustration and understanding of the inventive features of embodiments of the present invention.

The combustor system 100 generally includes an outer housing 116 (also referred to as a combustor can) in which inner liner 108 is positioned. Exhaust gas exiting an internal combustion engine enters the combustor system 100 and particularly inner liner through exhaust inlet 112.

A first portion of the exhaust is admitted into the central liner 108 through exhaust admission holes 110. As is generally known, this portion of the exhaust flow is used to generate or is at least heated by a flame within the combustor system 100 to raise the temperature of the exhaust flow through the combustor system 100 to assist in regeneration and/or aftertreatment of a downstream DPF or other aftertreatment device (not shown). This portion of the exhaust flow that passes internal to liner 108 is therefore consequently at, in relative terms, a high temperature.

A second portion of the exhaust, that is not admitted into liner 108, is diverted around liner 108 and passes through annulus 114. Annulus 114 is formed between inner liner 108 and housing 116. This outer portion of the exhaust flow is not exposed to the combustion within the liner 108 and is therefore at a lower temperature relative to the portion of the flow within liner 108.

As such, the complete temperature profile of the exhaust flow (formed from both the flow internal to liner 108 and within annulus 114) is substantially radially stratified with a hot central core and cool radial periphery. However, as noted previously, it is typically desirous to have a generally uniform temperature profile for the exhaust gas as it enters the downstream DPF or other aftertreatment device. As such, liner 108 includes a mixing arrangement 105 for promoting mixing of the hot exhaust gas flowing within liner 108 with the cool exhaust gas flowing through annulus 114.

With this general overview of the exhaust flows through the combustor system 100 presented, more specific operation of the combustor system 100 and its various features, components and portions will be discussed.

Figure 2:
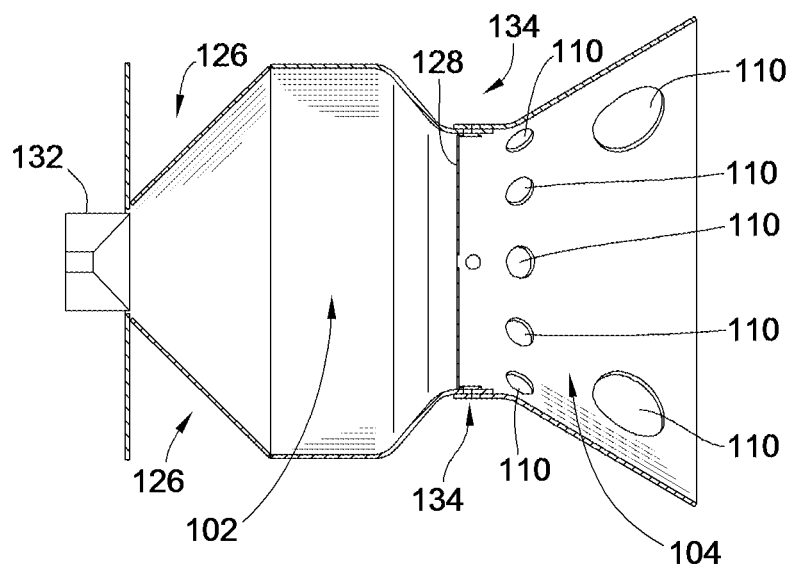
FIG. 2 is a side cross section view of a first portion of a combustor liner constructed in accordance with one embodiment of the present invention having a conical flare to allow nozzle flows to attach to the liner and be directed outwards, filling a first combustion (primary) zone.
Figure 4:
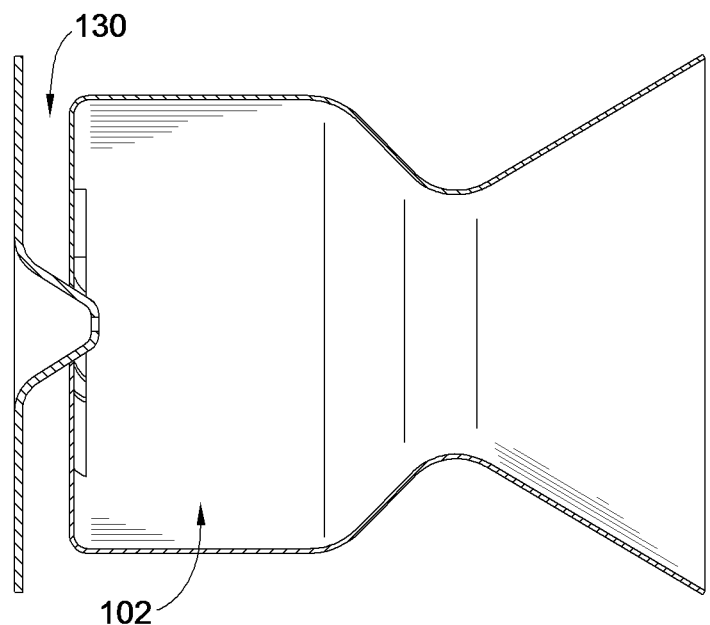
FIG. 4 is a side section view of a further embodiment of the liner incorporating a dome-swirler around the nozzle to allow gasses from outside of the liner to enter the first (primary) combustion zone.

For simplicity of description, the combustor system 100 will be broken down into three zones 102, 104, 106. The primary zone 102 utilizes a gas turbine airblast style nozzle 132 (see FIG. 2) or other nozzle technology creating atomized or vaporized fuel coupled with high velocity air flows which is used to generate the flame for heating the exhaust gas admitted into liner 108. When incorporated with the dome swirler 130 of FIG. 4, the nozzle could produce only a fuel spray to mix with the flows from the dome swirler to achieve the same effect. The airblast style nozzle 132 has good fuel atomization performance over wide flow ranges. Another benefit of the airblast style nozzle 132 is that it introduces a significant quantity of air into the primary zone 102 of the combustor system 100. The air introduced through the nozzle 132 can be used for combustion due to the relatively large flow quantity of air through an airblast nozzle 132 relative to the fuel flow rate. This introduction of metered air and fuel through the nozzle along with the close regulation of exhaust through the liner holes 110 allows for precise control of the air-fuel ratio in the primary zone 102 at the igniter zone 118, resulting in reliable light-off. The nozzle 132 also makes optimum use of the added air by using it for fuel atomization, thermal protection, and initialization of proper flow patterns in the primary zone 102. Air for the airblast style nozzle 132 can either be supplied by an auxiliary source or by the engine exhaust itself.

Figure 3:
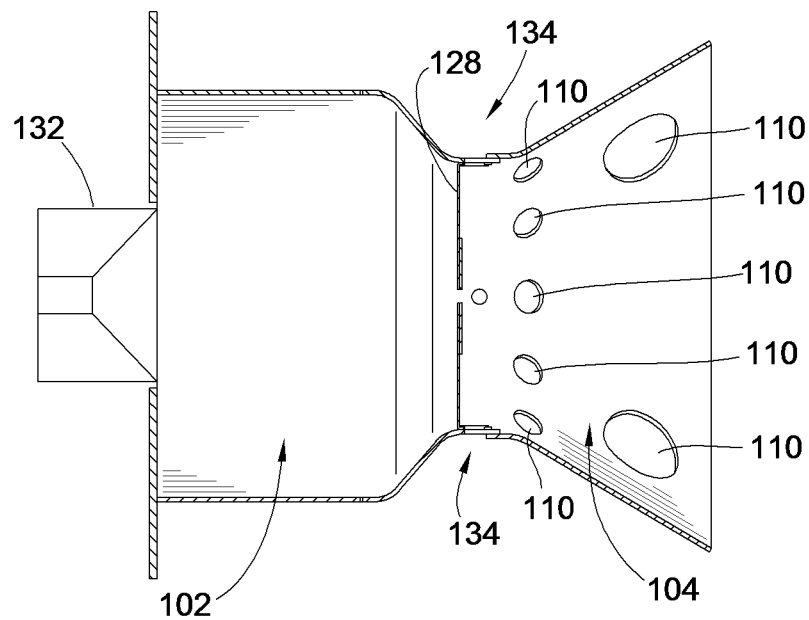
FIG. 3 is a side section view of an alternate embodiment of the liner having no conical flare to introduce nozzle flows, recognizing that the nozzle flow pattern dictates the airflow pattern in the first (primary) zone of the combustor, and illustrating an optional flow plate at the narrow part of the liner.

A major performance dictator for the primary zone 102 is the airflow pattern. By incorporating geometries such as the radius 103 (illustrated in FIG. 1) at the end of the primary zone 102, swirling nozzle air, and optional dome-swirlers, the airflow pattern of the gasses in the primary zone 102 can be optimized to create good mixing, flow isolation, and stable flow patterns such as flow recirculation. Specifically, the embodiment of FIG. 2 includes a conical flare 126 on the left side, upstream side, to allow nozzle flows to attach to the liner 108 and be directed outwards, filling the first combustion primary zone 102. The embodiment of FIG. 3 is without a conical flare to introduce nozzle flows. The nozzle flow pattern dictates the airflow pattern in the primary zone 102 of this combustor. An optional bluff body 128 is also shown in this illustration at the narrow part of the liner 108. The embodiment of FIG. 4 incorporates a dome-swirler 130 around the nozzle. The dome swirler allows gasses from outside of the liner 108 to enter the primary zone 102.

Embodiments of the present invention utilize these design aspects in order to enhance the performance of the combustor system 100. Airflow patterns are created with the design features in such a way as to isolate the ignition location from exhaust gases. The airblast nozzle is also capable of directing the fuel spray to locations within the igniter zone 118 in such a way as to assist with ignition reliability.

Another feature included in some embodiments is a bluff body 128 strategically located at the end of the primary zone 102 of the combustor system 100. This bluff body 128 differs from other flame anchors in that it is located at the downstream end of the flame. The bluff body 128 acts as a continuation of the radius 103 (see FIG. 1) of the primary zone wall in order to more directly control airflow directions in the primary zone 102. The bluff body 128 can also assist in the isolation of the primary zone 102 from exhaust gasses in order to improve ignition reliability.

As a result of these design features, embodiments of the primary zone 102 provide isolation of igniter zone 118 for protection (dome swirler design too), recirculation for stability and mixing, self regulation of combustion mixture, and low temperature operation mode to protect components (rich operation). Embodiments are also radiused at the downstream end for recirculation, and can include an optional bluff body and/or an optional dome swirler. This primary zone 102 is smaller than the intermediate zone 104, and may provide protection from an asymmetrical exhaust inlet in some embodiments.

The intermediate zone 104 of the illustrated combustor system 100 incorporates several design features that are significantly different from other aftertreatment combustors. A primary change from other designs is this combustor's apparent lack of holes in a significant portion of this section of the combustor liner 108. The liner 108 also has more holes 110 on the side nearest the exhaust inlet 112 to the combustor system 100 (assuming a non-inline flow configuration). As may be seen, not all of the exhaust gas is introduced through the liner 108, and some of the exhaust gas is allowed to flow around the liner 108. This hole configuration scheme has been shown to be a more effective method for exhaust gas introduction than a configuration with even distribution or a configuration with more holes away from the introduction side. Temperature uniformity and emissions performance are enhanced by this configuration of the intermediate zone 104.

Another aspect of the intermediate zone 104 is that it locates the exhaust introduction holes 110 in such a way as to prevent exhaust introduction into the primary zone 102. The intermediate zone 104 has also been designed in such a way as to allow significant amounts of the combustion to transfer from the primary zone 102 to the intermediate zone 104. The flame may fully transfer to the intermediate zone 104 from the primary zone 102 or only partially transfer from the primary zone 102. It is also possible for no measurable flame to be present in the intermediate zone 104.

As a result of the configuration of the intermediate zone 104 and introduction holes 110, there is provided a balance of diffusion/small scale/turbulent and bulk mixing therein. One implementation of introduction holes 110 that accomplishes good turbulent and bulk mixing is shown in the figures. The first row of holes 110 is small to introduce turbulence and small scale mixing. The second row of holes 110 is larger to create stronger bulk mixing by creating larger diameter exhaust jets into the intermediate zone 104.

The intermediate zone 104 provides uniform exhaust introduction and mixing flows with its "more holes on top" approach. The flows inside the intermediate zone are then protected from excessive exhaust introduction, and are protected by the only-partial exhaust introduction for emissions. That is, the intermediate zone 104 provides closely controlled bypass regulation with its geometry. Because the components are well mixed and with the allowance of flame transition, the intermediate zone 104 burns lean to Stoichiometric as the oxygen diminishes in the exhaust. This is achieved by presenting the correct percentage of exhaust entering the beginning of this intermediate zone 104 through the hole 110 configuration.

Another feature of the combustor system 100 is the diffuser geometry at the exhaust inlet. The radius 103 (identified in FIG. 1) at the downstream end of the primary zone 102 not only assists with the primary zone air flow patterns, but this taper also creates a location of increased volume to recover flow pressures from the exhaust gases. The increased static pressure in this diffuser location 134 improves flow performance through the exhaust admission holes 110. This geometrical configuration at the point of exhaust inlet to the diffuser 134 also assists in minimizing pressure losses of the whole combustor system 100 by creating a higher static pressure reservoir behind the exhaust introduction holes 110.

As mentioned above, any engine exhaust that does not enter the intermediate zone 104 through the exhaust admission holes 110 of the liner 108 enters the annulus 114 of the combustor system 100. The geometrical configuration of the annulus 114 assists in the creation of uniform flows for the dilution zone 106 of the combustor system 100 to be discussed more fully below. In one embodiment, fins are provided in the annulus 114 to provide flow balancing. The annulus 114 also serves to thermally isolate the high temperature combustion inside the liner 108 from the combustor walls 116.

The total exhaust flow that passes through the combustor system 100 transitions through a pressure drop. There are several configurations for the occurrence of the pressure drop in the present combustor design. The first configuration incorporates relatively low pressure loss mixing geometry 120/124/122 of mixing arrangement 105 at the entrance to the dilution zone 106, resulting in the primary pressure loss locations being at the annulus 114 entrance and across the introduction holes 110. The second configuration incorporates a relatively low restriction annulus, resulting in the pressure loss locations being the introduction holes 110 and the entrance to the dilution zone 106, i.e. pressure drop across the mixer 106 is approximately equal to the pressure drop across the liner 108 and introduction holes 110. This is different from other designs where the pressure loss through the geometrically separate mixer is independent from and does not provide any benefit to flows in the combustion zones, its function is strictly for mixing. Thus, the pressure admission of exhaust into the liner 108 through admission holes 110 can be tuned using the geometry of the downstream mixing arrangement 105.

The separation of the mixer from the liner in other combustors requires a sequential and separate drop across both components, resulting in the higher total pressure drop requirement for these combustors. In other words, one pressure drop is presented to direct the exhaust gas into a liner while a second pressure drop occurs as the flow passes through the mixer arrangement.

The incorporation of these features all into the same overall liner 108 geometry allows for flow distribution regulation, the generation of penetrating jets and mixing flows for combustion, as well as efficient hot/cold mixing all from the same pressure drop, resulting in a lower overall pressure loss than other designs which must use several pressure drops in series to achieve the same conditions.

The dilution zone 106 is the location of the combustor system 100 where the hot gasses from inside the liner 108 are mixed with the relatively cool engine exhaust that has been bypassed around the liner 108 and through the annulus 114. Embodiments of the present invention incorporate geometries for the dilution zone 106 that are significantly different from those in other exhaust aftertreatment combustors as will be discussed below. One embodiment may be seen in FIG. 5.

Figure 6:
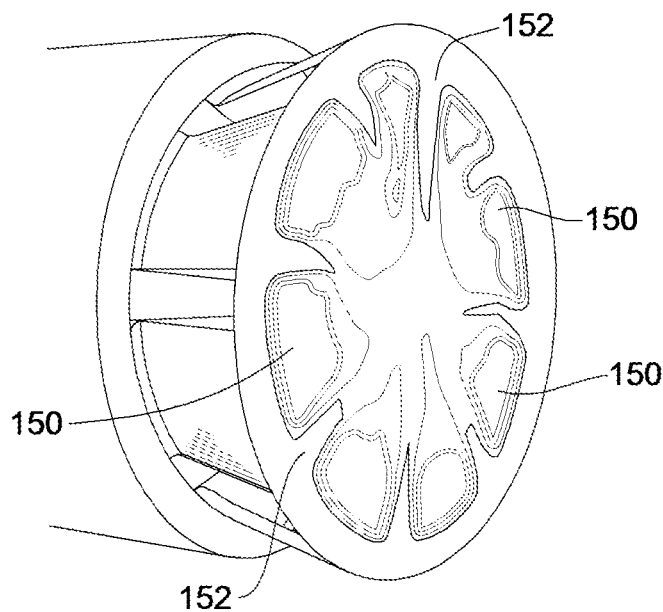
FIG. 6 is an isometric view of the simplified liner exit/mixing zone of FIG. 5 including contours of temperature that are shaded on a cross section taken perpendicular to the burner axis at the end of the mixing geometry illustrating the hot gases escaping the liner and the cooler exhaust gas which is directed to surround the hot gasses.

The hot and cold flows are directed into multiple interleaving patterns to generate high efficiency mixing as may be seen in FIG. 6. As may be seen from this FIG. 6, contours of temperature are displayed on a cross section taken perpendicular to the burner axis at the end of the mixing geometry. The contours 150 represent hot gases escaping the liner 108. The contours 152 represent the cooler exhaust gas which is directed to surround the hot gasses. The surface area between the hot and cold flows is maximized in order to speed the mixing process. Cold flow attaches and is directed radially inward along a flow surface 120 from the outer diameter of the liner 108 to the center of the combustor with this geometry. Optional surface 122 serves a dual purpose. Surface 122 creates a recirculation zone for the cool gasses following surface 120 to enter while also forcing the hot liner 108 gasses to exit downstream of surface 124 so that it is surrounded by cooler flows. A major benefit of this design is that it requires minimal pressure loss in order to generate mixing. The flows follow geometrical shapes 120/122/124 of the liner 108 and do not rely on flow jet penetration or other high pressure related mechanisms. Because this mixer design does not require increased pressure drop to generate mixing, it is not as dependent on exhaust flow rates for performance. This mixing scheme has better performance across a wider range of engine operation with less pressure losses than the previously employed turbulator-style mixers.

Another advantage of the mixing geometry of the dilution zone 106 is the ability to tune flow distributions. The tabs or fins 122/124 on the mixer section do not have to all have the same geometrical size, direction, or spacing. They may be incorporated in such a way as to accommodate for imbalances in the annulus flow field or imbalances in the temperature profile of the exhaust gases upstream of the mixing geometry. Typically, the temperature profile of the exhaust gases is generally concentric with the hotter temperature flow radially inward of radially outer cooler flows. This ability to tune the local behavior of the mixer will allow local variations in outlet temperature to be mitigated, such as due to variations in the temperature profile of the exhaust flow upstream of the mixing geometry.

The geometry of the dilution zone 106 also allows for flame quench capability through rapid mixing of the large amount of relatively cool exhaust from the annulus 114 with the combustion products that are exiting the intermediate zone 104. Quick quenching at the end of the burner prevents flame impingement on downstream components in the exhaust system in the event of fuel-rich combustion or other states where the flame may extend downstream further than normal. This quenching behavior provides close coupled options to shorten the overall system lengths and packaging requirements.

Figure 7:
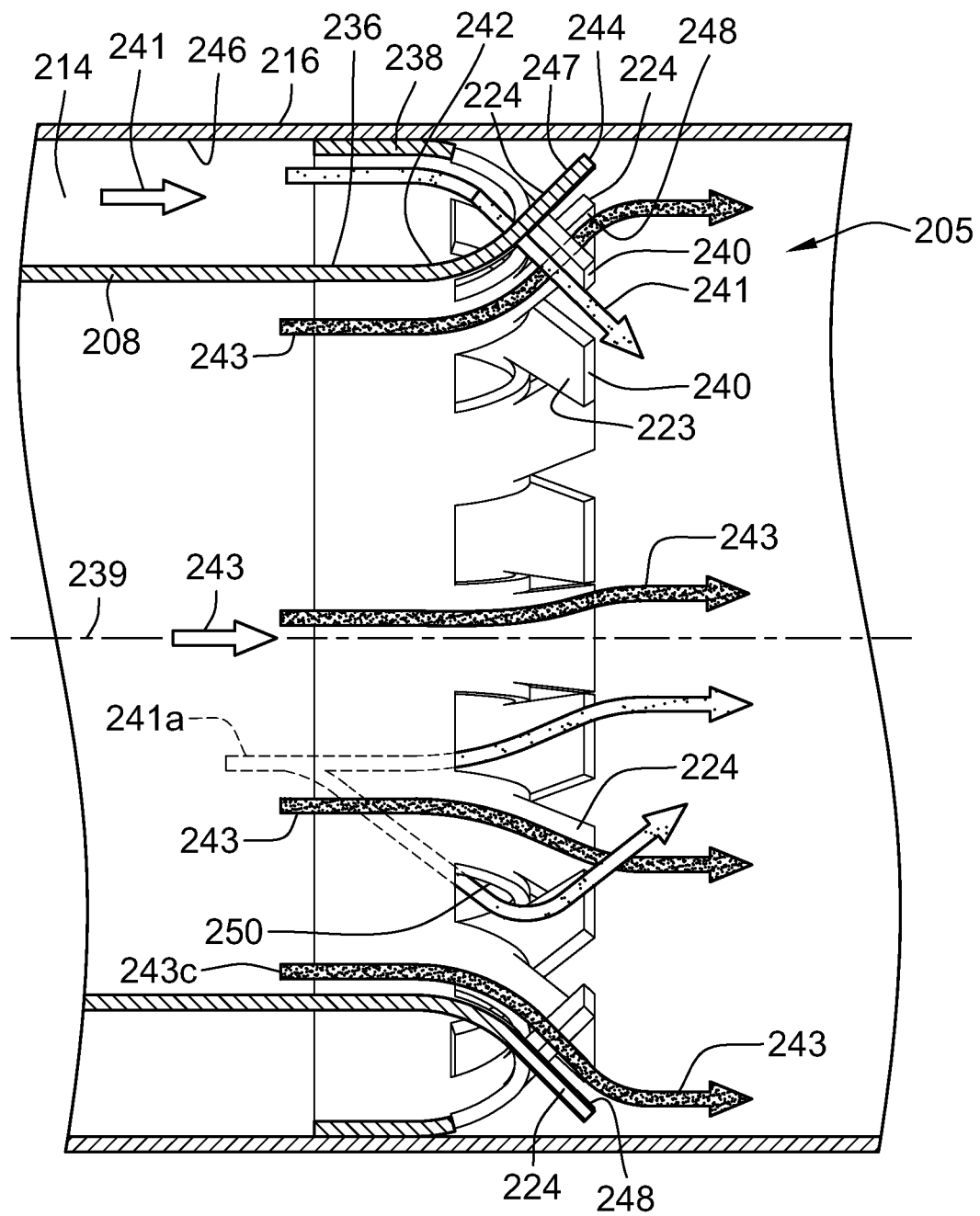
FIG. 7 is a simplified cross-sectional illustration of an alternative mixing arrangement illustrated at the downstream end of a combustion liner.
Figure 8:
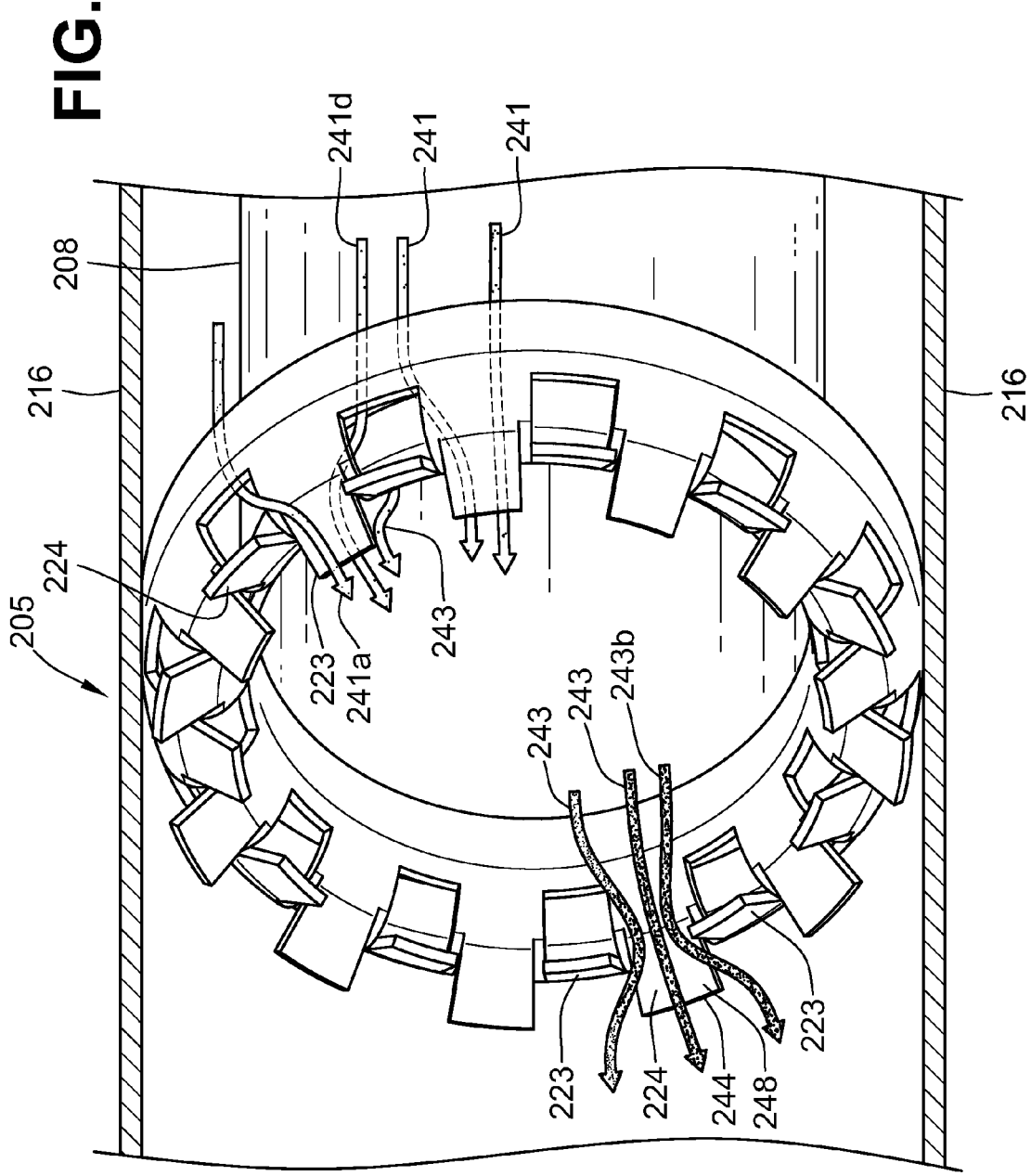
FIG. 8 is a simplified perspective illustration of the mixing arrangement of FIG. 7.

FIGS. 7 and 8 are simplified illustrations of an alternative embodiment of a mixing arrangement 205 providing efficient mixing according to the teachings of the present invention. The mixing arrangement 205 may form part of a dilution zone and positioned downstream of an intermediate zone such as described previously.

Figure 5:
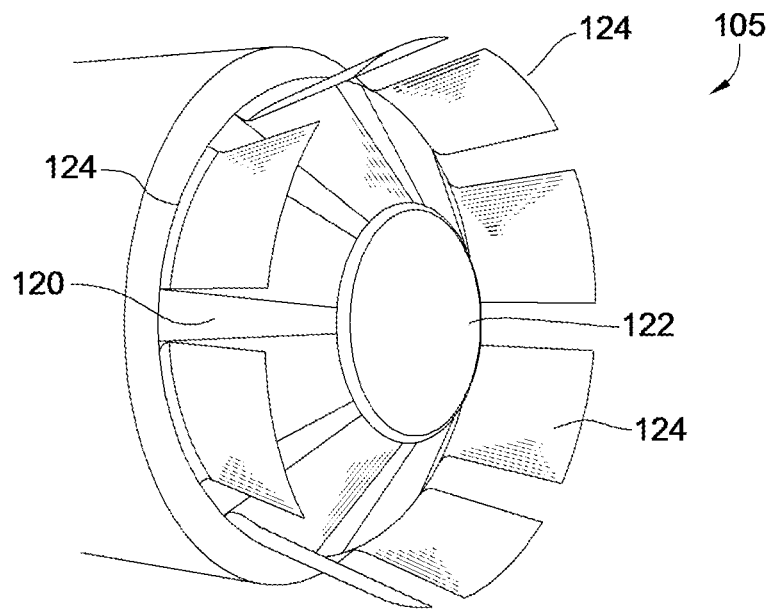
FIG. 5 is a simplified isometric view of an embodiment of the liner exit/mixing zone.

With primary reference to FIG. 7, similar to the mixing geometry of the arrangement of FIG. 5, the mixing arrangement 205 operates direct cooler flows from annulus 214 radially inward while directing or drawing warmer flows from inside liner 208 radially outward to effectuate mixing of the cool and warm flows separated by inside liner 208. In this embodiment, the geometry fails to include central surface 120 that is generally perpendicular to the flow axis of the combustor so as to reduce the overall pressure drop of the mixer arrangement 205. Further, this removes the central surface from being directly exposed to a significant amount of heat from the high temperature exhaust gas flowing through the center of the combustor reducing likelihood of failure thereof and ultimately of the mixing arrangement.

With reference to the cross-sectional illustration of FIG. 7, this embodiment additionally fails to include any tabs or other geometries that extend into and are directly impinged by the high temperature exhaust flows, illustrated by arrows 243 (also referred to herein as "hot exhaust gas 243") internal to liner 208.

The mixer arrangement 205 is formed in liner 208 proximate outlet end 236. However, in other embodiments the mixer arrangement 205 could be formed as a separate piece and connected to the liner 208 or could be positioned slightly upstream or downstream from outlet end 236.

The mixer arrangement 205, as illustrated, includes a plurality of inward directed tabs 223 and a plurality of outward directed tabs 224 (referred to generally and in combination as "tabs 223, 224") for directing the cool flow, illustrated by arrows 241 (also referred to herein as "cool exhaust gas 241") from annulus 214 and warm flow 243 from inside liner 208.

The tabs 223, 224 segment the overall flow of exhaust into various different portions and then direct and rearrange those portions accordingly to promote increased mixing of and heat transfer between the different segments so as to adjust the temperature profile of the exhaust flowing through the can 216 of the combustor as desired. The combined temperature profile of the exhaust gas is defined by the cool exhaust gas 241 flowing through the annulus 214 in addition to the flow of hot exhaust gas 243 flowing through the inside of liner 208. Typically, this temperature profile has a hot central core (provided by the flow inside liner 208) with a cool outer periphery (provided by the flow through annulus 214). This typical temperature profile is illustrated in a simplified manner in FIG. 11. Typically, the mixing arrangement 205 will angularly interleave hot and cold flows in alternating angular orientations.

In the illustrated embodiment, the inward directed tabs 223 have inlet ends 238 at which the inward directed tabs 223 are generally tangent to an axis 239 of the flow path. The inward directed tabs 223 terminate in outlet ends 240 at which the outward directed tabs are skewed relative to axis 239. The inlet ends 238 are upstream of the outlet ends 240. Typically, the outlet ends 240 will be oblique, i.e. non-parallel or non-perpendicular relative to axis 239, but this is not necessary in all embodiments. In a preferred embodiment, the inlet ends 238 have an angle of between about zero degrees and about twenty degrees relative to axis 239. The outlet ends 240 have an angle of between about 30 degrees and 70 degrees in preferred embodiments. Other tab arrangements and profiles may be incorporated to tune the mixing arrangement 205, as will be more fully discussed below, to effectuate desired mixing.

A generally arcuate section transitions between the inlet and outlet ends 238, 240. When the arcuate section approaches the outlet ends 240, the arcuate section begins to flatten out. The arcuate section is generally concave when viewed radially outward such that the inlet ends 238 are radially outward of the outlet ends 240. The arcuate section reduces turbulence in the flow directed thereby to reduce pressure drop by smoothly transitioning the flow from being parallel to axis 239 to skewed radially inward. The arcuate section could be formed by a plurality of generally flat segments connected together. However, it is preferred to avoid such an arrangement to promote the least amount of pressure drop due to obstructions as the intersection of the different segments that would resist smooth flow of the cool exhaust gas 241 along the inner/upstream surface of the inward directed tabs 223.

In this embodiment, cool exhaust gas 241 flowing through annulus 214, illustrated in simplified form as arrow 241, is directed radially inward by radially inward directed tabs 223. In the illustrated arrangement, the inward directed tabs 223 do not extend radially inward beyond an inner surface of the inner liner 208. However, in other embodiments, the outlet end may be positioned radially inward of the inner surface of liner 208. Beneficially, in the event that the inward directed tabs 223 do extend radially inward beyond the liner 208 such that they would otherwise be directly in the flow of the hot exhaust gas, illustrated in simplified form as arrow 243, the cool exhaust gas 241 flowing from annulus 214 assists in preventing the hot exhaust gas 243 from directly impinging on the inward directed tabs 223. The cool exhaust gas 241 acts as a buffer to reduce the heat transfer to the inward directed tabs 223 such that lower quality material and or thinner tabs 223 can be used. This also provides a significant advantage over the previous embodiment that incorporates plate 120.

The cool exhaust gas 241 that is directed radially inward will displace a portion of the central hot exhaust gas 243 and also mix with some of the hot exhaust gas 243 as well.

The outward directed tabs 224 have inlet ends 242 at which the outward directed tabs 224 are generally tangent to axis 239 of the flow path. The outward directed tabs 224 terminate in outlet ends 244 that are skewed relative to axis 239. An arcuate section transitions between the inlet and outlet ends 242, 244. The arcuate section begins to flatten out as it approaches the outlet ends 244. The outward directed tabs 224 are generally concave outward such that the outward directed tabs 224 are increasingly radially further away from central axis 239 when moving in a downstream direction. Depending on desired downstream temperature profiles, desired mixing, and overall pressure drop across the mixing arrangement 205, the outlet ends 244 may or may not contact the inner surface 246 of combustor can 216. In the illustrated embodiment, the outlet ends 244 are spaced radially inward of inner surface 246 of can 216.

Cool exhaust gas 241 directly impinges on upstream surface 247 of the outward directed tabs 247. This directs a portion of the cool exhaust gas 241 to be diverted laterally, i.e. generally angularly relative to axis 239, toward the adjacent inward directed tabs 223 (arrows identified as 241A in FIGS. 7 and 8 illustrate this flow). This assists in creating a zone or void in the cool exhaust gas 241 flowing just downstream of the tabs 223, 224 in to which hot exhaust gas 243 may be drawn radially outward. Further, the outward directed tabs 224 assist in directing or otherwise drawing the hot exhaust gas 243 radially outward. More particularly, hot exhaust gas 243, illustrated more particularly by hot exhaust gas 243C in FIG. 7, will attach to the downstream surface 248, i.e. the surface that faces radially inward and generally downstream, as it flows through the mixing arrangement 205 and be directed radially outward and into the location that would have otherwise been occupied by the cool exhaust gas 241, absent the inclusion of mixer 205.

Further, some of the cool exhaust gas 241 directed angularly/laterally by the outward directed tabs 224 is entrained into adjacent portions of the cool exhaust gas 241 that is directed radially inward by the adjacent inward directed tabs 223. This arrangement is illustrated by arrow 241D of FIG. 8. Alternatively, some of the cool exhaust gas 241 is also directed laterally, i.e. angularly, behind and downstream the adjacent inward directed tabs 224, illustrated as arrow 241A of FIG. 8.

Thus, the lateral directing of the cool exhaust gas 241 and radial drawing of the hot exhaust gas 243 promotes rearrangement of various segments of the different portions (cool and hot exhaust gas 241, 243) of the combined exhaust gas flow within can 216. By rearranging the segments of the hot exhaust gas 243 and cool exhaust gas 241, the hot exhaust gas 243 is no longer primarily centrally located (see generally FIG. 12) while the cool exhaust gas 241 is no longer forming an annulus surrounding the hot exhaust gas 243 (see generally FIG. 12). As such, surface area between the different temperature exhaust gas flows 241, 243 is increased promoting more rapid heat transfer and thermal distribution to promote generating a more uniform temperature profile at a given axial location along axis 239 downstream from mixing arrangement 205.

In the embodiment illustrated in FIG. 7, the inward direct tabs 223 and outward direct tabs 224 are substantially mirror images of one another having similar profiles except that some are directed radially inward (inward directed tabs 223) and the others are directed radially outward (outward directed tabs 224). The inlet ends 238, 242 are substantially axially aligned relative to one another and the outlet ends 240, 244 are also substantially axially aligned relative to one another. Both inlet ends 238, 242 are in fluid communication with annulus 214 and cool exhaust gas 241.

In this embodiment, the tabs 223, 224 are formed from a single piece of material and are therefore connected by an intermediate C-shaped connector portion that transitions between adjacent ones of the tabs 223, 224. However, in other embodiments, the tabs 223, 224 could be formed independent from one other such that each tab 223, 224 is a single piece that is then later connected to adjacent, opposite directed, tabs 223, 224. Alternatively, a portion of the tabs 223, 224 could be formed from a single piece. For example, all of the inward directed tabs 223 could be formed from a single piece and all of the outward directed tabs 224 could be formed from a second single piece. Alternatively, the mixer arrangement 205 could be formed from a plurality of angular portions having both inward and outward directed tabs 223, 224.

Figure 12:
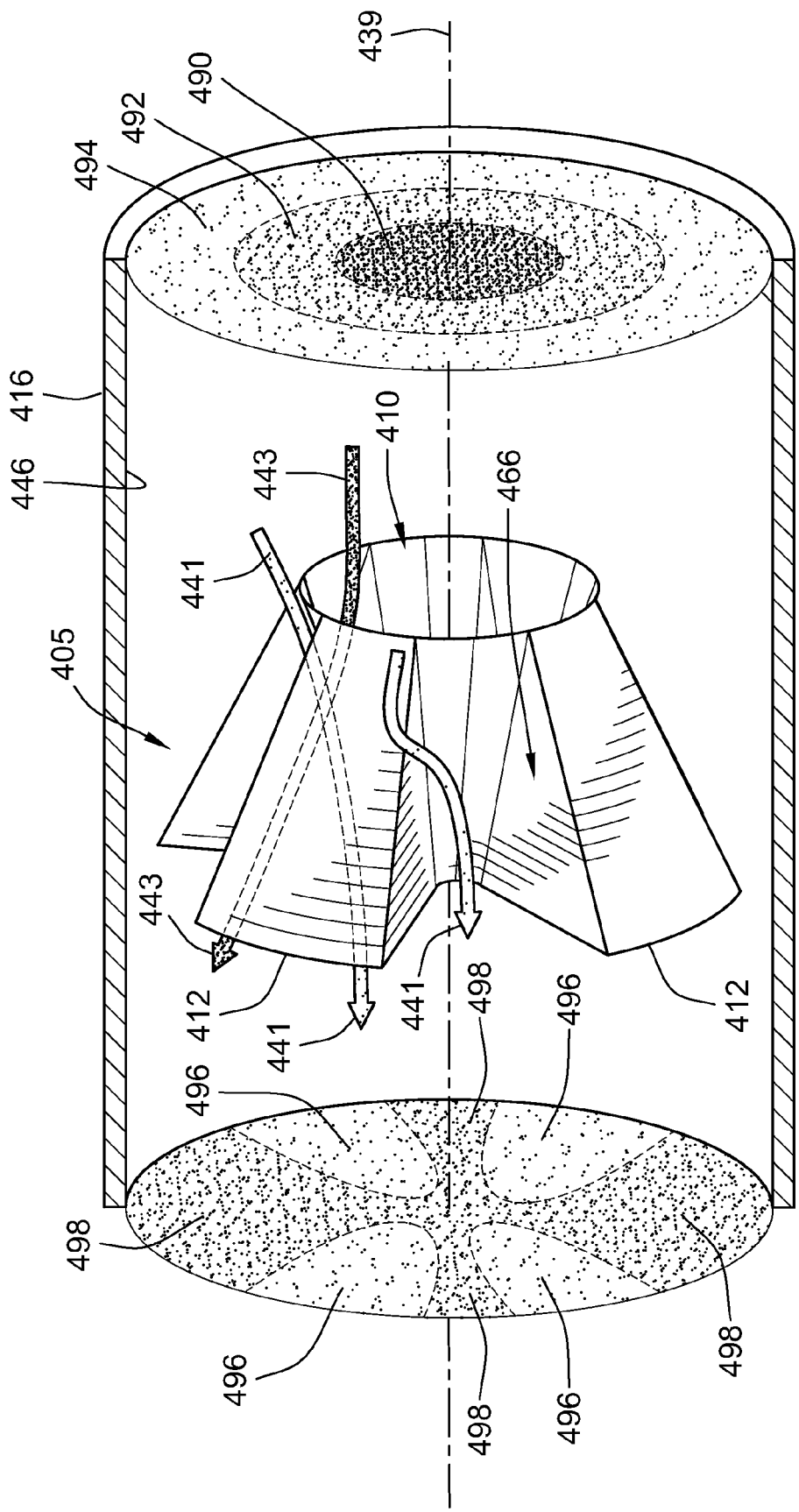

If the temperature profile of the exhaust flow is substantially radially stratified and angularly uniform, such as illustrated in FIG. 12 for example, when viewed in a plane substantially perpendicular to axis 239 just upstream of the mixer arrangement 205, the mixer arrangement 205 will most likely be substantially angularly uniform as well, i.e. all of the inward directed tabs 223 will be substantially identical and all of the outward directed tabs 224 will be substantially identical. This will promote more uniform mixing angularly about axis 239

However, if the temperature profile of the exhaust flow is not radially or angularly uniform, the tabs 223, 224 can be tuned to adjust the resulting temperature profile downstream from mixing arrangement 205 to provide a more uniform temperature profile. For example, if the temperature profile has the hot core shifted vertically upward, the tabs 223, 224 will be tuned to direct more cool exhaust gas 241 from the portion of the annulus 214 below axis 239 upward and tuned to prevent less cool exhaust gas 241 from the portion of the annulus 241 above axis 239 from being directed downward toward axis 239. Similarly, the tabs 223, 224 will be tuned such that less hot exhaust gas 243 from within liner 208 above axis 239 will be drawn upwards while more hot exhaust gas 243 from below axis 239 will be drawn downwards. It should be noted that the terms upwards and downwards are relative terms used merely for one example and not necessary for all embodiments and is used merely for explanation with reference to the illustrations.

The tabs 223, 224 may be tuned in various ways to assist in varying the flow of exhaust for a desired downstream temperature profile downstream of the mixing arrangement 205. For example, the tabs 223, 224 may be made wider (i.e. have a larger angular dimension) or they could be made taller (i.e. have a larger radial dimension). Additionally, the taper of the portion between the inlet and outlet ends could be adjusted to direct more or less flow radially.

Further, the axial location of the inward directed tabs 223 may be adjusted relative to the outward directed tabs 224 to adjust the amount of exhaust gas that is either entrained into the flow of the adjacent tabs 223, 224 or that is permitted to pass behind and continue downstream at a similar radial location downstream of the mixing arrangement 205 as it was flowing upstream to mixing arrangement 205. For example, referring to FIG. 7, if the outward directed tabs 224 were move axially upstream, within limits, more cool exhaust gas 241 would be able to be entrained into the flow path defined by the adjacent inward directed tabs 223 and therefore directed radially inward. This is because the cool exhaust gas 241 would be directed laterally upstream of the adjacent inward directed tab 223, rather than downstream from the inward directed tab 223. This would promote increased cooling of the central core of the combined exhaust flow. Further, a larger zone downstream of tabs 223, 224 would be generated for hot exhaust gas 243 to flow radially outward further promoting increased amounts of hot exhaust gas 243 to flow radially outward.

However, it should be noted that if inward directed tabs 223 are axially spaced too far relative to the radially outward directed tabs 224, limited mixing may occur as the coordinated interplay of rearranging the location of the hot exhaust gas 243 with cool exhaust gas 241 and visa versa, will not occur and the tabs 223, 224 will merely act as restrictions in the exhaust flow with reduced mixing capabilities. For example if radially outward directed tab was too far upstream from the radially inward directed tab, when the cool exhaust gas 241 flow laterally off of the upstream face of the outward directed tab 224 the flow would just transition back behind the outward directed tab 224 before it axially reached the radially inward directed tab 223 and would not be entrained into the flow that is being directed radially inward by the inward directed tab 223. Alternatively, the same would occur if the outward directed tab 224 were too far downstream from the inward directed tabs 223.

As will be more fully illustrated below, the shape and contour of the tabs 223, 224 can be altered such that the tabs 223, 224 act more like scoops to more aggressively engage and direct the corresponding exhaust gas flows.

Figure 9:
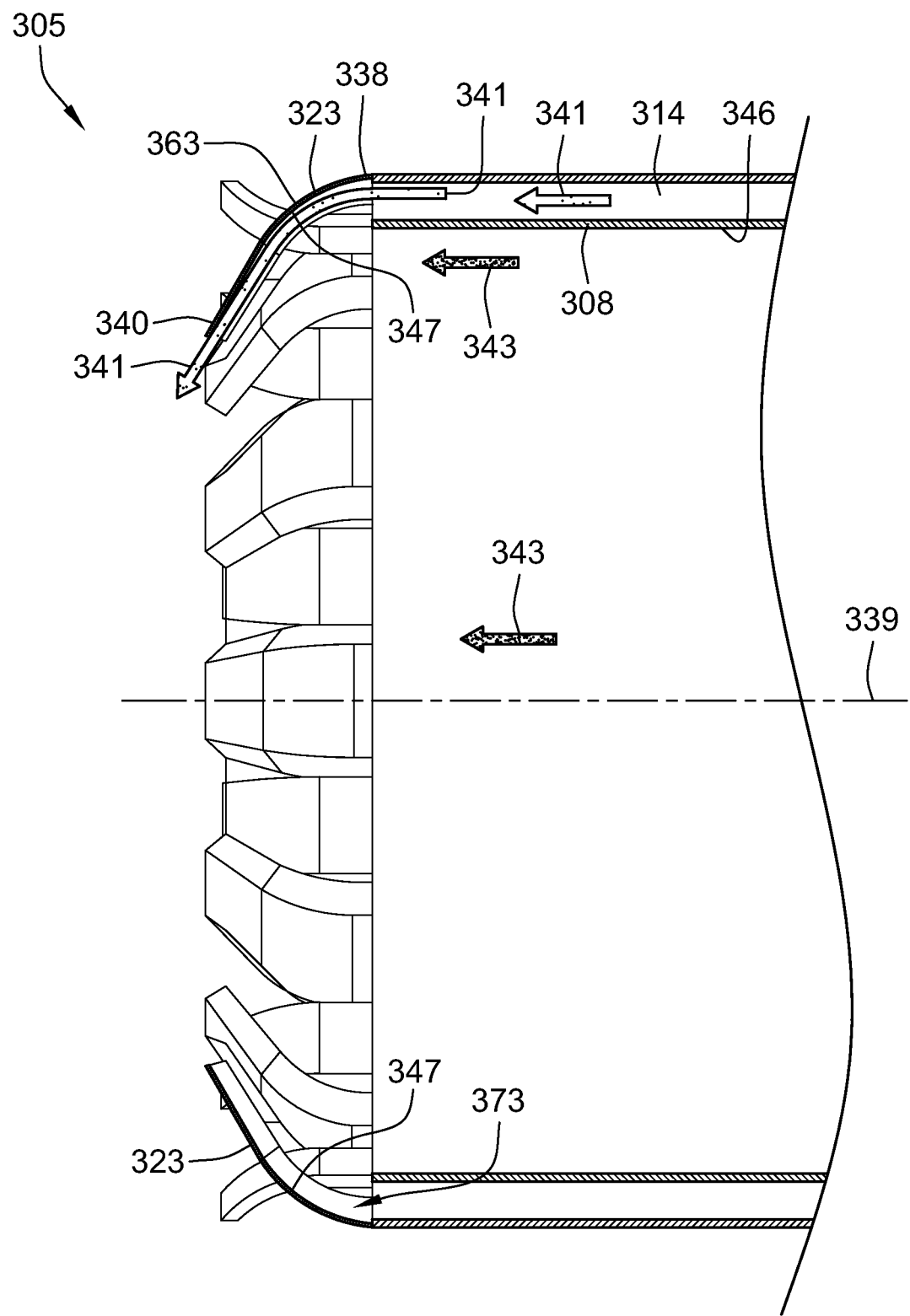
FIG. 9 is a simplified cross-sectional illustration of an alternative mixing arrangement illustrated at the downstream end of a combustion liner.

FIG. 9 illustrates a further embodiment of a mixing arrangement 305 according to the teachings of the present invention. This embodiment is substantially similar to mixing arrangement 205 discussed previously.

Figure 10:
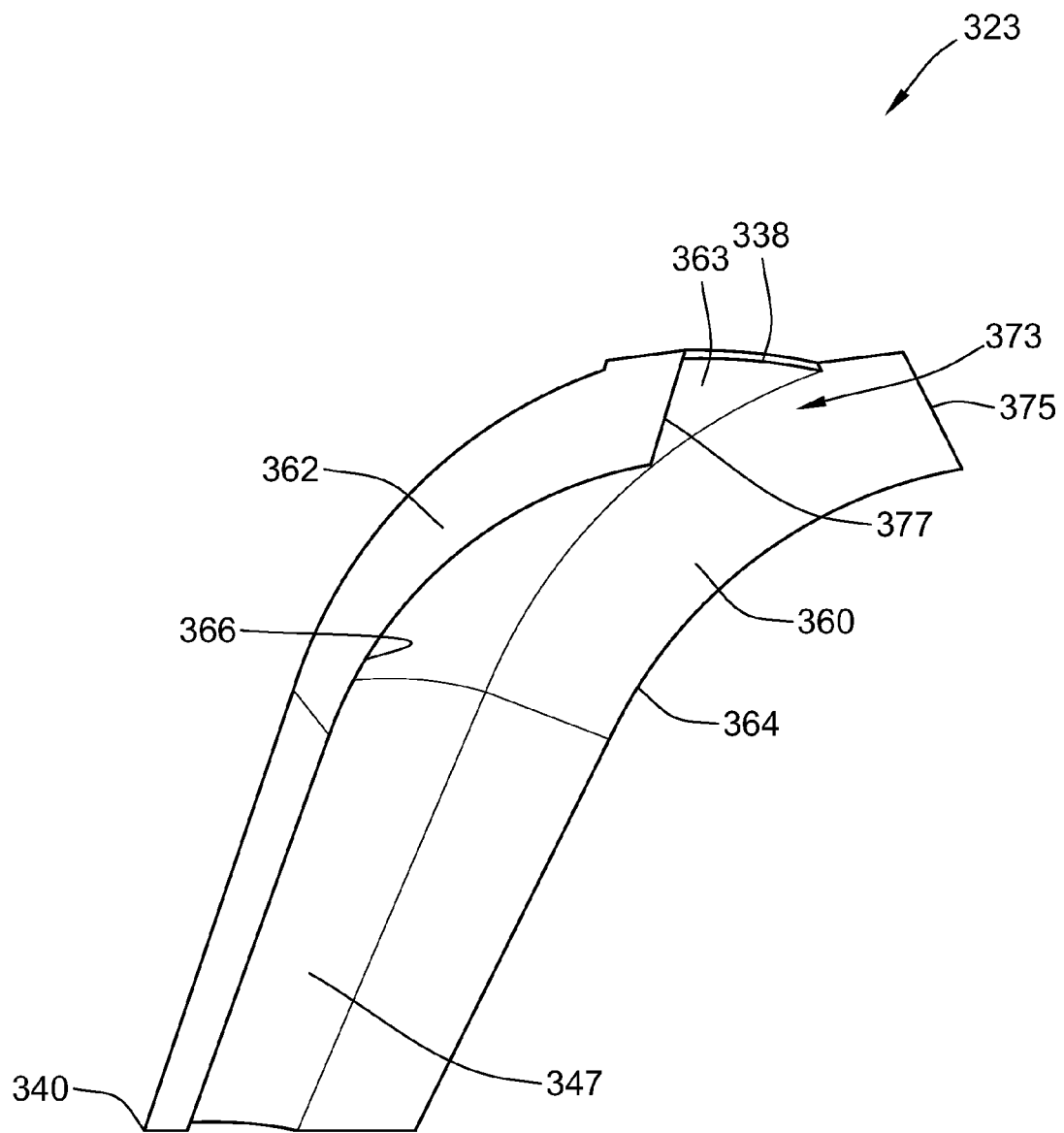
FIG. 10 is a perspective illustration of a flow directing tab of the mixing arrangement of FIG. 9.

However, this embodiment has a slightly different geometry for the inward directed tabs 323, while the outward directed tabs 324 have a substantially same geometry as the previous embodiment. A perspective illustration of an inward directed tab is illustrated in FIG. 10.

The inward directed tabs 323 are scoop shaped and are much more aggressive than the inward directed tabs 223 of the previous embodiment. The upstream surface 347 of the inward directed tabs 323 is concave in two dimensions.

Like the previous embodiment, the inward directed tabs 323 extend from an inlet end 338 to an outlet end 340. The inlet end 338 is radially outward positioned relative to the outlet end 340. Further, the inlet end 338 is generally tangent to the flow through annulus 314 and axis 339 while outlet end 340 is generally skew to the flow through annulus 314 and liner 308 as well as to axis 339.

Figure 11:
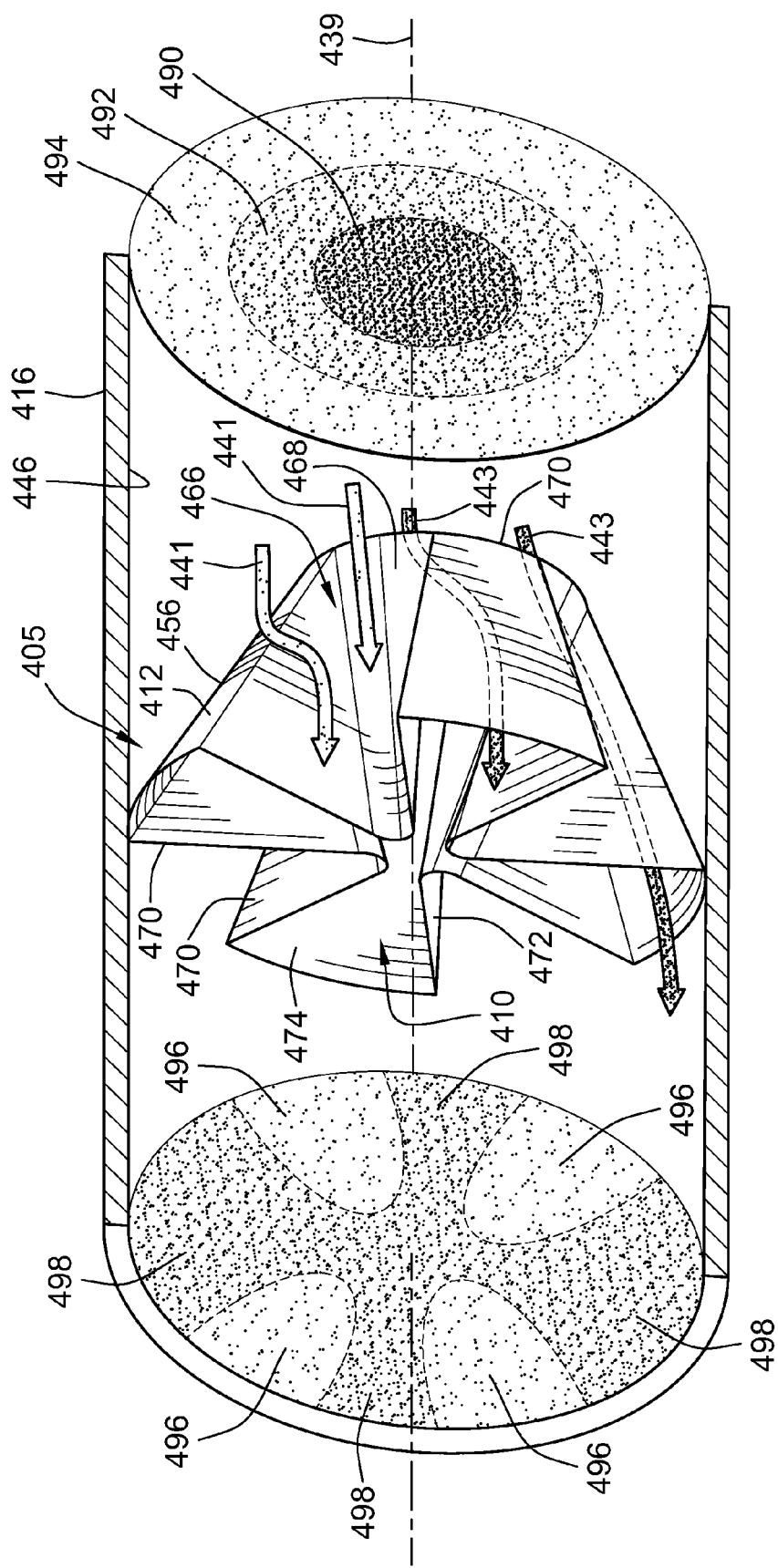
FIGS. 11-14 are simplified perspective illustrations of alternative mixing arrangements according to the present invention illustrating changes in temperature profile after exhaust gas passes through the mixing arrangements.

With primary reference to FIG. 11, in this embodiment, the inward directed tabs 323 have inward projecting wing portions 360, 362 extending generally perpendicular to a tangent to a bottom portion 363 of the tabs 323. The wing portions 360, 363 define opposed lateral edges 364, 366 of the inward directed tabs 323. The wing portions 360, 362 form a recess region 373 or trough positioned angularly between the opposed lateral edges 364, 366 that is generally open in the upstream direction to receive and catch the corresponding exhaust gas flow therein as it travels in the downstream direction. In this embodiment, wing portions 360, 362 and trough or scooped configuration cause the inward directed tabs 323 to more aggressively scoop or catch the cool exhaust gas 341 flowing through annulus 314 increasing the amount of cool exhaust gas 341 that is directed radially inward. The wing portions 360, 362 prevent the cool exhaust gas 341 that is scooped or caught by the inward directed tabs 323 from sliding angularly and detaching from the inward directed tabs 323, i.e. laterally off of the upstream surface 347, causing the cool exhaust gas 341 to be being more fully directed radially inward toward central axis 339.

While the inward directed tabs are generally angularly concave, the upstream surface 347 may be formed from a plurality of generally flat surfaces in the angular direction. The portions of upstream surface 347 defined by wing portions 360, 362 are generally flat between the corresponding lateral edge 364, 366 and bottom portion 363. Further, the portion of upstream surface 347 defined by bottom portion 363 is generally flat, not significantly angularly curved relative to central axis 339, between the wing portions 360, 362.

Further, the inlet end 338 of this embodiment has a width (angularly) that is larger than a width of the outlet end 340. Similarly, the bottom portion 363 of the inward directed tabs 323 tends to have a wider width proximate inlet end 338 relative to a width at the outlet end 340.

The wings 360, 362 include upstream portions 375, 377 that extend upstream from the upstream end of the bottom portion 363. These upstream portions can be used to assist in engaging more exhaust gas as well as to mount the inward directed tabs within a can of the combustor.

Inclusion of and alteration of wing portions 360, 362 is a further way to fine tune the mixing capabilities of the mixing arrangements according to the present invention. Inclusion of the wing portions 360, 362 helps assist in directing the exhaust gas flow by the tabs when the flow rate of the exhaust gas is low. This provides the particular mixing arrangement 305 with good operability over a wide range of exhaust gas flow rates.

Additionally, the inward directed tabs 323 are made more aggressive by extending the inward directed tabs 323 radially inward beyond the inner surface 346 of liner 308, such that the outlet end 340 is inline with the hot exhaust gas 343. As noted above, the cool exhaust gas 341 from annulus 314 that is scooped or caught by the inward directed tabs 323 acts as a buffer preventing the hot exhaust gas 343 within liner 308 from directly impinging on upstream surface 347 to protect the inward directed tabs 323 from damage due to excess heat transfer from hot exhaust gas 343.

Other embodiments, may utilize the scooped geometry for the outward directed tabs as well, depending on flow distribution requirements.

Embodiments may have outward directed tabs that include a convex upstream surface, i.e. surface that is directly impinged upon by cool exhaust gas, such as outward directed tabs 224 of prior embodiments. This arrangement can be used to assist in reducing pressure drop presented by the outward directed tabs. This allows the outward directed tabs to more easily direct the cool exhaust flows laterally (i.e. angularly towards the adjacent tabs) relative thereto rather than acting as a blunt obstruction positioned in the flow path.

Modeling and testing of various tab geometries has actually indicated that it may be possible to even substantially invert the temperature profile of the exhaust flow. More particularly, it may be possible to generate a temperature profile that has a radially outer annular portion that has a temperature range that is higher than a radially inner portion of the flow. This can be highly beneficial in certain situations. Typically, downstream devices such as a DPF's expel heat radially outward such that the radially outer portions of the DPF tends too cool quicker than radially inward portions thereof. As such, if the exhaust gas that is flowing therein is at a higher temperature at a radially outer portion than a radially inner portion, a more uniform temperature profile through the DPF may be maintained. This inverted temperature profile will be more fully described below in conjunction with a further embodiment, however, depending on geometry design, this can be incorporated in the previous designs as well.

While not expressly shown in the previous embodiments, but will be illustrated in later embodiments, the outward directed tabs could be replaced with tabs similar to inward directed tabs 323 to provide more aggressive directing of the hot exhaust gas. Further, while none of the outward directed tabs that have already been described include an inlet end that is directly positioned in the hot exhaust gas flows 243, 343, other embodiments can incorporate such a configuration. This provides a significantly more aggressive mixing arrangement. However, due to the higher temperature exhaust gas, these tabs would be required to be more heat resistant as the hot exhaust gas would directly impinge on the upstream surface thereof due to the lack of any buffering cool exhaust gas flowing along the upstream surface.

Figure 15:
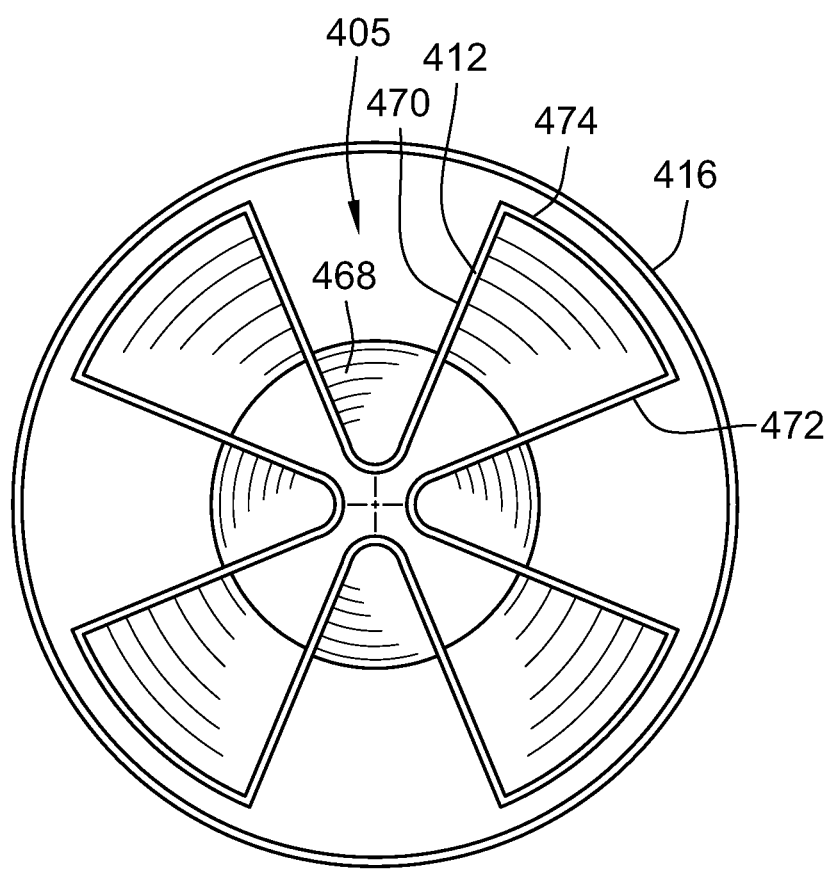
FIG. 15 is an end view illustration of the mixing arrangement of FIG. 1.

FIGS. 11, 12 and 15 illustrate a further embodiment of a mixing arrangement 405 according to the teachings of the present invention. This mixing arrangement 405 may be used in a combustor environment, such as the previous mixing arrangements, or in other exhaust gas flow paths where a combustor arrangement is not used, but it is desired to provide a more uniform temperature profile or low pressure mixing.

The mixing arrangement 405 again acts as a low pressure mixing arrangement that acts to rearrange segments of different portions of the exhaust gas flows to reposition portions of a central, typically high temperature, portion relative to a radially outer, typically low temperature, portion so as to promote mixing and typically heat transfer to generate a more uniform cross-sectional profile of the downstream flow. Again, as the mixing arrangement merely rearranges the flows by rearranging and angularly interleaving the segmented portions, limited pressure drop is incurred across the mixing arrangement 405.

This mixing arrangement defines an internal passage 410 through which a first portion of the exhaust flow passes. Typically, the first portion of the exhaust flow is the radially inward central portion, illustrated generally by arrow 443 and formed primarily by section 490 of the upstream temperature profile. As discussed previously, typically this radially inward flow has the highest temperature. The second portion of the exhaust flow passes external to the mixing arrangement 405 as illustrated by arrow 441. This flow is typically the cool exhaust gas 441 identified by segment 494 that is radially outward of and circumscribes the hot exhaust gas of section 490.

The mixing arrangement 405 has a plurality of leg portions 412 that continuously change in cross-sectional shape axially along flow axis 439 to radially and angularly re-arrange the hot and cool exhaust gas 441, 443 into different segments More particularly, the mixing arrangement 405 substantially segments the generally circular and concentric inner and outer portions into a plurality of angular segments as the flow passes downstream through flow path 410 axially from the beginning of the mixing arrangement to the end of the mixing arrangement 405. The angular segments angularly alternate between generally hot angular segments and generally cool angular segments down stream from the mixing arrangement 405.

FIGS. 11 and 12 include temperature profile schematics for illustrating relative temperature profiles of exhaust gas as it flows through the passage defined by a can 416 such as of a combustor, or alternatively of an exhaust pipe of an exhaust system. The stippling is used to illustrate different relative temperature sections. While generally discrete temperature portions or sections have been illustrated, this is merely for illustrative purposes and it will be understood that the various sections are not so well defined and will transition into one another. Heavier stippling is used to illustrate higher temperature sections while lighter stippling is used to illustrate lower temperature sections. Further, the temperature profiles are only representative temperature profiles that have been illustrated in simplified form for better understanding and illustration of the workings of the invention.

As such, the upstream temperature profile upstream of the mixing arrangement 405 has a hot central portion 490, an intermediate portion 492 and a cool outer annular portion 494.

Preferably, the leg portions 412 are configured such that the internal passage 410 through the mixing arrangement 405 maintains a substantially constant cross-sectional area. Similarly, the external flow area defined between an external surface 456 of the mixing arrangement 405 and an internal surface 446 of the can 416 in which the mixing arrangement 405 is installed remains substantially constant the entire length of the mixing arrangement 405. This prevents substantial compression of either the inner or outer exhaust gas flows 441, 443 so as to minimize the amount of pressure drop across the mixing arrangement 405.

However, as the mixing arrangement 405 rearranges the cool and hot exhaust gas 441, 443 from being generally concentrically/radially stratified portions into a plurality of angular segments, the surface area between the hot exhaust gas 443 and cool exhaust gas 441 is increased to increase heat transfer therebetween and mixing thereof with minimal pressure drop.

As illustrated in FIGS. 11 and 12, the downstream temperature profile downstream from the mixing arrangement 405 has a plurality of generally angular segments such that the temperature profile is angularly stratified due to the angular interleaving action of the mixing arrangement 405. More particularly, there are four low temperature segments, illustrated with reference numeral 496 and four higher, relatively, temperature segments, illustrated with reference numeral 498. The low temperature segments 496 would most typically be angularly aligned with valleys 466 between adjacent legs 412, while the higher temperature segments 498 would be angularly aligned with legs 412.

While it is preferred to have constant cross-sectional areas along the length of the mixing arrangement 405 from the inlet to the outlet, other embodiments may be designed with a variation in cross-sectional area to tune the rearrangement of the various portions of the exhaust flow. While illustrated as being rotation symmetric, the mixing arrangement 405 could have the inlet offset relative to the outlet or flow axis 439 depending on the temperature profile of the exhaust gas flow upstream thereof. The inlet need not be circular in nature but could more closely approximate a shape of a particular temperature profile of the exhaust flow upstream of the mixing arrangement 405.

In the illustrated embodiment, adjacent legs 412 define valleys 466 therebetween. The bottom 468 of the valley 466 tapers radially inward when moving in a downstream direction from the inlet toward the outlet. The bottom 468, as illustrated, also transitions from a concave inward profile to a concave outward profile when moving in a downstream direction. This tends to force the hot exhaust gas 443 to transition radially outward and angularly into legs 412 so as to more fully define an angular higher temperature segment 498.

The legs 412 have two sidewalls 470, 472 on opposed sides of a cover portion 474 that extend between cover portion 474 and bottoms 468. The cover portion tapers radially outward when moving in a downstream direction so as to radially stretch the internal passage 410 of legs 412 radially outward when moving downstream through the mixing arrangement 405. Further, the sidewalls 470, 472 taper toward one another as they extend increasingly radially inward when traveling in the downstream direction.

The inlet end of the mixing arrangement 405, in the illustrated embodiment, is generally circular while the outlet end is generally cruciform with four legs 412. However, other shapes with more than four legs could be used to generate more angular temperature segments.

In general, the mixing arrangements according to embodiments of the present invention function to adjust a mean radial distribution of the different portions of the exhaust flow. More particularly, when moving downstream through a mixing arrangement, the inner portion of the exhaust flow, typically hotter portion, has a mean radial distribution that is transitioned radially outward by transitioning more of the inner exhaust flow radially outward while the outer portion of the exhaust flow has a mean radial distribution that is transitioned radially inward by transitioning more of the outer exhaust flow radially inward. Further, the mixing arrangements act to rearrange a flow that is generally radially stratified into an angularly segmented and stratified flow.

Figure 13:
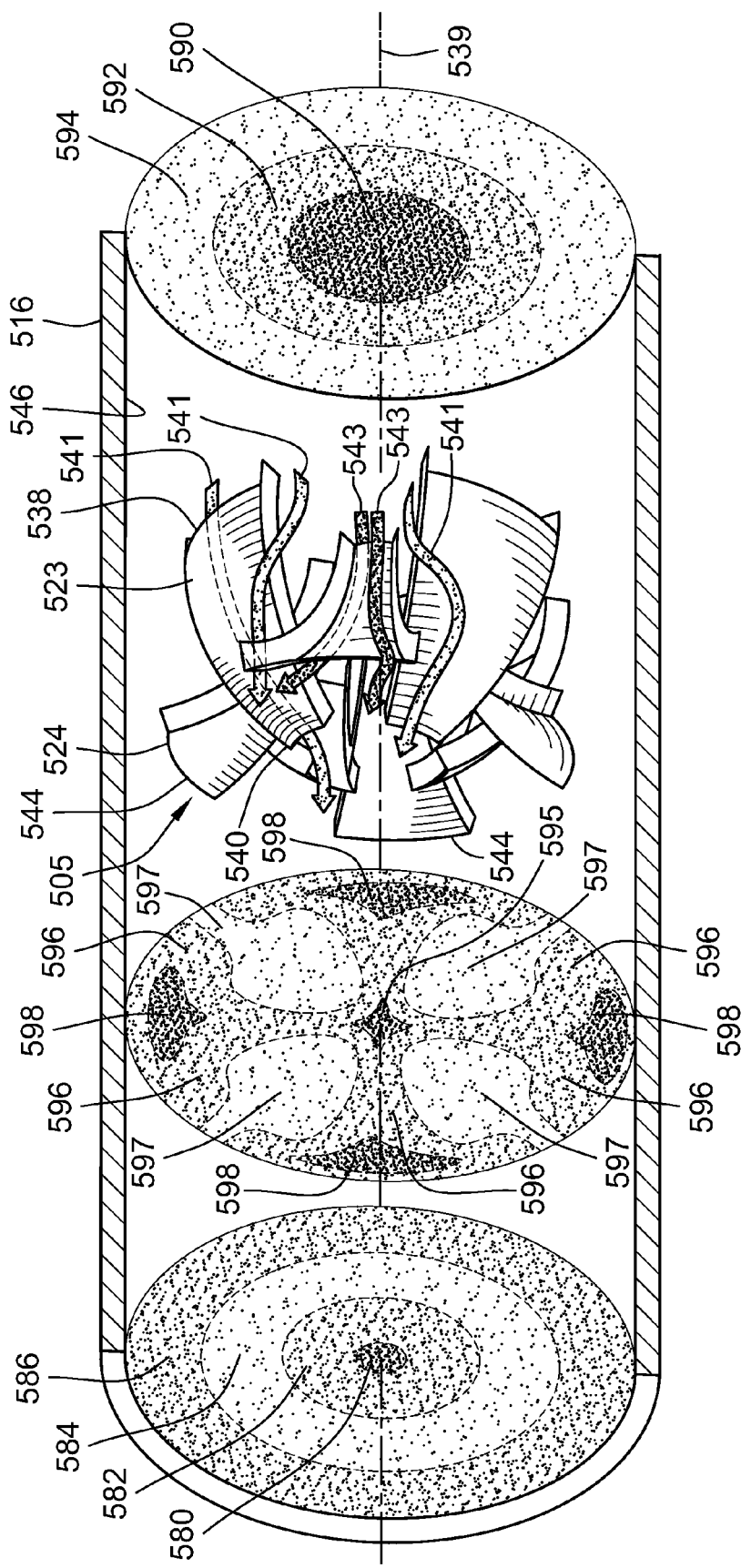
Figure 14:
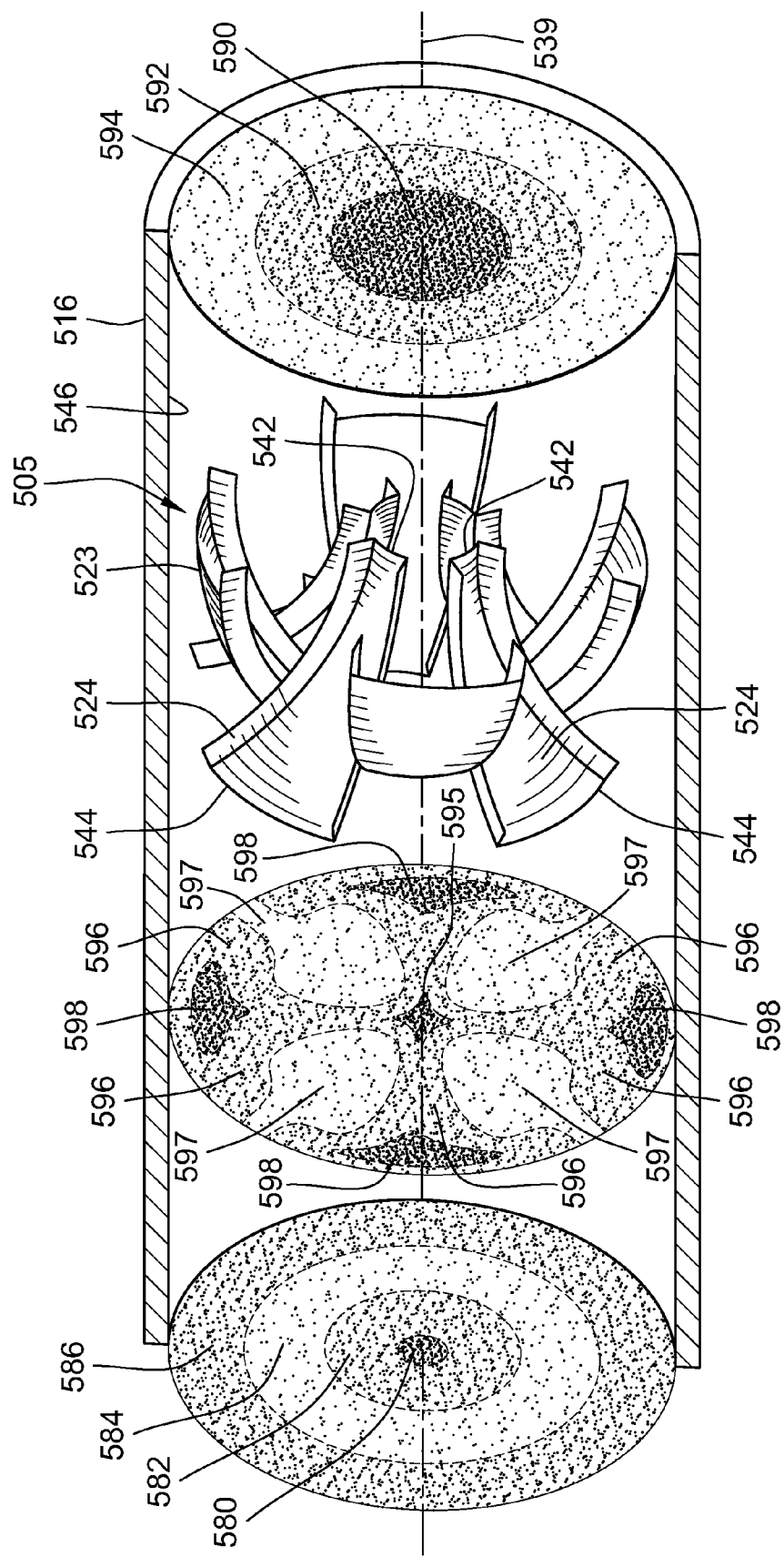

FIGS. 13 and 14 illustrate a further embodiment of a mixing arrangement 505 according to the present invention. This mixing arrangement includes inward and outward directed tabs 523, 524 that are substantially similar to tab 323 of previous embodiments. The inward directed tabs 523 direct radially outer cool exhaust gas 541 radially inward while the outward directed tabs 524 direct radially inner hot exhaust gas 543 radially outward.

The inward directed tabs 523 have inlet ends 538 and outlet ends 540. The tabs 523 extend in an arcuate path that transitions radially inward between the inlet ends 538 to the outlet ends 540. However, as noted with reference to FIG. 10, these types of tabs are also concave in an angular direction about axis 539. The tabs also include wing portions, which are substantially identical to the wing portions discussed with regard to the tab of FIG. 11.

FIG. 13 illustrates that some of the cool exhaust gas 541 will be directly caught by the radially inward directed tabs 523 and will be directed radially inward as it flows within the recess defined by the inward directed tabs 523. Further, some cool exhaust gas will be directed angularly, i.e. laterally, behind the inward directed tabs and attach to the back surface of the inward directed tabs 523 and be directed radially inward as well.

The outward directed tabs 524 are substantially similar to the inward directed tabs 523, but are directed to direct radially inner hot exhaust gas 543 radially outward, such as illustrated by arrows 543. Further, some of the inner hot exhaust gas 543, that is not directly aligned with and therefore directly caught by the outward directed tabs 524 will attach to the back side of the outward directed tabs 524 and be directed radially outward.

The outward directed tabs 524 extend from an inlet end 542 to an outlet end 544. Again, like inward directed tabs 523, the inlet ends 542 are substantially tangent to the flow of exhaust along axis 539 while the outlet ends 544 are substantial skew, and preferably skew, to outlet flow axis 539. The upstream inlet ends 542 have a narrower width than the downstream outlet ends 544, primarily due to space limitations. The upstream surface of the outward directed tabs 524 is concave outward such that the upstream surface of the tabs 524 become increasingly radially further away from the central axis 539 when moving in the downstream direction. Again, the outward directed tabs 524 also include the wing portions for assisting in catching the exhaust gas and preventing the exhaust gas from laterally detaching from the tabs. These tabs are also concave angularly, but this is opposite to being concave about axis 539.

With reference to the temperature profiles illustrated in FIGS. 13 and 14, it is illustrated that the mixing arrangement 505 has been tuned to invert the temperature profile, as discussed previously. More particularly, the upstream temperature profile has inner hot segment 590, intermediate segment 592 and radially outer cool segment 594. Again, these segments are merely schematic and for illustrative purposes.

Just downstream from the mixing arrangement 505, the temperature profile has a plurality of different temperature segments formed from different segments of the hot exhaust gas 543 that has been directed radially outward and different segments of the cool exhaust gas 541 that has been directed radially inward. More particularly, there is a hot central segment 595, generated by hot exhaust gas 543 that is generally not directed by any of the tabs 523, 524. This hot central segment 595 is bounded by an intermediate segment 596 that has a plurality of leg portions that extend radially outward and that are angularly spaced apart.

These legs are generally separates from one another by a plurality, four, cool segments 597. These cool segments 597 are extend to the radially outer boundary of the temperature profile but are substantially centrally located radially inward from the outer periphery of the temperature profile. These cool segments 597 are substantially aligned angularly with the radially inward directed tabs 523 with the majority of the cool segment aligned radially with outlet ends 540 of the inward directed tabs 523.

Further yet, the temperature profile includes four additional hot segments 598 that are positioned radially outward proximate the outer periphery of the temperature profile and proximate the can 516. These hot segments 598 are generally defined by the inner hot exhaust gas 543 that is directed radially outward by the outward directed tabs 524. These hot segments 598 are generally angularly offset from the cool segments 597 and angularly aligned with the outward directed tabs 524.

Just slightly downstream, a further temperature profile is illustrated. This temperature profile illustrates a slight temperature inversion. More particularly, there is still a generally hot segment 580 proximate the central axis 539. This hot segment is now bounded by an intermediate segment 582. The intermediate segment 582 is then bounded by a cold segment 584 which is formed by the previous cold segments 597 as they begin angularly merge together. However, bounding this cold segment 584 is now an intermediate segment 586. This intermediate segment 586 is provided by the merging of hot segments 598 in combination with the previous intermediate segments 596. It should be noted that the temperature profile is substantially more uniform however as a majority of the cold and a majority of the hot segment 590 and cold segment 594 from the upstream profile have been replaced by intermediate segments.

As noted previously, this inverted temperature profile can be beneficial when supplying exhaust gas to a DPF where heat is rapidly dissipated from radially outer portions thereof. This inverted temperature profile permits a more constant temperature profile through the DPF by supplying a larger heat content to the radially outer portions of the DPF to counter act the greater heat loss therefrom.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of mixing a flow of exhaust flowing along a flow axis including the step(s) of:
    rearranging the flow of exhaust along the flow axis via a mixer arrangement coaxial to the flow axis, the exhaust made up entirely of combusted gases, wherein rearranging the flow of exhaust includes the steps of:
        directing a first portion of the flow radially outward away from the flow axis by passing the first portion of the flow only over a plurality of first flow directing tabs, of the mixer arrangement, that are convex to the flow axis, and
        directing a second portion of the flow radially inward toward the flow axis by passing the second portion of the flow only over a plurality of second flow directing tabs, of the mixer arrangement, that are concave to the flow axis; and
    wherein the steps of directing the first and second portions includes separating the first portion into a plurality of first segments and directing the first segments radially outward and separating the second portion into a plurality of second segments and directing the second segments radially inward, wherein the step of rearranging includes increasing the surface area between the first and second portions.

2. The method of claim 1, wherein the steps of directing the first and second portions of the flow includes changing a cross-sectional shape of the first segments of the first portion of the flow and changing the cross-sectional shape of the second segments of the second portion of the flow.

3. The method of claim 2, wherein:
    the steps of directing the first and second portions of the flow includes changing the radial distribution of the first portion of the flow relative to the second portion such that the first portion of the flow has a first mean distance from the flow axis prior to the step of rearranging and the first portion of flow has a second mean distance from the flow axis after the step of rearranging, the second mean distance being greater than the first mean distance and wherein the second portion of the flow has a third mean distance from the flow axis prior to the step of rearranging and the second portion of flow has a fourth mean distance from the flow axis after the step of rearranging, the fourth mean distance being less than the third mean distance.

4. The method of claim 3, wherein the cross-sectional area of the first segments remains substantially constant during the step of rearranging and the cross-sectional area of the second segments remains substantially constant during the step of rearranging.

5. The method of claim 1, wherein the first portion of the flow and the first segments are radially inward of and substantially circumscribed by the second portion of flow and the second segments when the step of rearranging begins, after the step of rearranging, the first segments are a plurality of first angular segments and the second segments are a plurality of second angular segments, the exhaust flow being formed by alternating first and second angular segments after the step of rearranging.

6. The method of claim 5, wherein:
    the exhaust flow has a temperature profile that is radially stratified having high temperatures at the radially inner flow and having lower temperatures at the radially outer flow, relative to the inner flow, prior to the step of rearranging; and
    after the step of rearranging, the temperature profile of the exhaust flow is angularly stratified by the alternating first and second angular segments of high and low temperatures relative to one another.

7. The method of claim 1, wherein:
    the steps of directing the first and second portions of the flow includes changing the radial distribution of the first portion of the flow relative to the second portion such that the first portion of the flow has a first mean distance from the flow axis prior to the step of rearranging and the first portion of flow has a second mean distance from the flow axis after the step of rearranging, the second mean distance being greater than the first mean distance and wherein the second portion of the flow has a third mean distance from the flow axis prior to the step of rearranging and the second portion of flow has a fourth mean distance from the flow axis after the step of rearranging, the fourth mean distance being less than the third mean distance.

8. The method of claim 7, wherein the first portion of the flow is radially inward of and substantially circumscribed by the second portion of flow when the step of rearranging begins, the step of directing the second portion of flow radially inward includes directly directing the second portion of portion of flow radially inward and directing the first portion of flow radially outward is performed indirectly and is facilitated by the introduction of the increased amount of the second portion of the flow radially inward.

9. An exhaust gas mixer for interleaving portions of a flow of exhaust gas from an internal combustion engine comprising:
    a plurality of first flow directing tabs;

a plurality of second flow directing tabs;
the first and second flow directing tabs arranged to circumscribe a flow axis; and
the first flow directing tabs arranged to direct radially inward exhaust flow radially outward; and
the second flow directing tabs arranged to direct radially outer exhaust flow radially inward; and
wherein:
the first flow directing tabs have an upstream inlet end and a downstream outlet end;
the second flow directing tabs have an upstream inlet end and a downstream outlet end;
the inlet ends of the first flow directing tabs are radially inward of the outlet ends of the first flow directing tabs;
the inlet ends of the second flow directing tabs are radially outward of the outlet ends of the first flow directing tabs;
the inlet ends of the first flow directing tabs are radially inward of the inlet ends of the second flow directing tabs; and
the outlet ends of the first flow directing tabs are radially outward of the outlet tends of the second flow directing tabs and the inlet ends of the first flow directing tabs.

10. The exhaust gas mixer of claim 9, wherein:
each of the first and second flow directing tabs have an upstream surface facing upstream;
the upstream surface of the first flow directing tabs being concave from the inlet end to the outlet end such that an angle between a tangent of the upstream surface and the flow axis increases in magnitude when moving in a direction from the inlet end toward the outlet end; and
the upstream surface of the second flow directing tabs being concave from the inlet end to the outlet end such that an angle between a tangent of the upstream surface and the flow axis increases in magnitude when moving in a direction from the inlet end toward the outlet end.

11. The exhaust gas mixer of claim 10, wherein:
the angle between the upstream surface of the first flow directing tabs and flow axis proximate the inlet end is between about zero (0) and twenty (20) degrees and the angle between the tangent and the upstream surface of the first flow directing tab proximate the outlet end is between about thirty (30) and seventy (70 degrees); and
the angle between the upstream surface of the second flow directing tabs and flow axis proximate the inlet end is between about zero (0) and twenty (20) degrees and the angle between the tangent and the upstream surface of the second flow directing tabs proximate the outlet end is between about thirty (30) and seventy (70) degrees.

12. The exhaust gas mixer of claim 10, wherein the upstream surface of the first flow directing tabs faces radially outward and the upstream surface of the second flow directing tabs faces radially inward.

13. The exhaust gas mixer of claim 10, wherein:
each of the first flow directing tabs are scoop shaped including a trough bottom and two generally radially extending sidewalls extending outward from the trough bottom and radially outward; and
each of the second flow directing tabs are scoop shaped including a trough bottom and two generally radially extending sidewalls extending outward from the trough bottom and radially inward.

14. The exhaust gas mixer of claim 9, wherein the plurality of first and second flow directing tabs are formed from a single body being a continuous piece of material formed into a generally annular shape, the body having an upstream end that is generally circular inlet and downstream end that is formed from a plurality of generally triangularly shaped angularly spaced legs extending outward from the flow axis, the tabs not being formed from independent pieces of material and then subsequently connected together.

15. An exhaust gas mixer for interleaving portions of a flow of exhaust gas from an internal combustion engine comprising:
a plurality of first flow directing tabs;
a plurality of second flow directing tabs;
the first and second flow directing tabs arranged to circumscribe a flow axis; and
the first flow directing tabs arranged to direct radially inward exhaust flow radially outward;
the second flow directing tabs arranged to direct radially outer exhaust flow radially inward; and
wherein:
the first flow directing tabs have an upstream inlet end and a downstream outlet end;
the second flow directing tabs have an upstream inlet end and a downstream outlet end;
the inlet ends of the first flow directing tabs are radially inward of the outlet ends of the first flow directing tabs;
the inlet ends of the second flow directing tabs are radially outward of the outlet ends of the first flow directing tabs;
the inlet ends of the first flow directing tabs are radially inward of the inlet ends of the second flow directing tabs; and
the outlet ends of the first flow directing tabs are radially outward of the outlet tends of the second flow directing tabs and the inlet ends of the first flow directing tabs; and
wherein the inlet end of the plurality of first flow directing tabs is narrower than the downstream outlet end of the plurality of first flow directing tabs, and wherein the inlet end of the plurality of second flow directing tabs is wider than the downstream outlet end of the plurality of second flow directing tabs.

16. A diesel fuel exhaust aftertreatment system for treating diesel fuel exhaust from an internal combustion engine comprising:
a heat generating device for heating the exhaust generating a radially stratified temperature profile;
a mixer arrangement downstream from the heat generating device, the mixer arrangement including:
a plurality of first flow directing tabs configured to direct a radially inward portion of the exhaust flow radially outward by passing the radially inward portion of the exhaust flow only over the plurality of first flow directing tabs; and
a plurality of second flow directing tabs, each having an inlet attached to an interior surface of the combustor can, configured to direct a radially outer portion of the exhaust flow radially inward by passing the radially outer portion of the exhaust flow only over the plurality of second flow directing tabs.

17. The aftertreatment system of claim 16, further comprising:
a combustor housing;
a combustor liner disposed within the combustor housing with the radially inward portion of the exhaust flow passes through the combustor liner;
an annulus located between an inner surface of the combustor housing and an outer surface of the combustor liner, the radially outward portion of the exhaust flow passing through the annulus; and
wherein the first flow directing tabs draw the radially inward portion of the exhaust passing through the combustor liner radially outward toward the inner surface of the combustor housing and the second flow directing tabs direct the radially outward portion of the exhaust passing through the annulus radially inward, such that the mixer arrangement is configured to form a plurality of angularly stratified segments formed from alternating segments of the inward portion of the exhaust and the outward portion of the exhaust.

18. The aftertreatment system of claim 17, wherein the temperature profile, taken perpendicular to the flow path, of the exhaust passing through the annulus and the combustor liner upstream of the mixer arrangement is generally radially stratified having high temperatures at the radially inner flow and having lower temperatures at the radially outer flow, relative to the inner flow; and
wherein the temperature profile, taken perpendicular to the flow path, of the exhaust downstream of the mixing arrangement is generally angularly stratified having alternating high and low temperature portions, respectively.

19. The aftertreatment system of claim 18, wherein the high temperature portions are formed by high temperature exhaust that has been radially outwardly directed by the first flow directing tabs and are aligned with the first flow directing tabs and the low temperature portions are formed by low temperature exhaust that has been radially inwardly directed by the second flow directing tabs and are aligned with the second flow directing tabs.

20. The aftertreatment system of claim 17, wherein the first flow directing tabs are scoop shaped being both radially concave and angularly concave.

21. The aftertreatment system of claim 20, wherein the first flow directing tabs have a main bottom portion and two outward extending sidewalls between which the main bottom portion extends, the main bottom portion and two outward extending sidewalls defining a trough shape that opens in an upstream direction.

22. A diesel fuel exhaust aftertreatment for treating diesel fuel exhaust from an internal combustion engine comprising:
a heat generating device for heating the exhaust generating a radially stratified temperature profile;
a mixer arrangement downstream from the heat generating device, the mixer arrangement including:
a plurality of first flow directing tabs configured to direct a radially inward portion of the exhaust flow radials outward; and
a plurality of second flow directing tabs, each having an inlet attached to an interior surface of the a combustor can, configured to direct a radially outer portion of the exhaust flow radially inward;
a combustor housing;
a combustor liner disposed within the combustor housing with the radially inward portion of the exhaust flow passes through the combustor liner;
an annulus located between an inner surface of the combustor housing and an outer surface of the combustor liner, the radially outward portion of the exhaust flow passing through the annulus;
wherein the first flow directing tabs draw the radially inward portion of the exhaust passing through the combustor liner radially outward toward the inner surface of the combustor housing and the second flow directing tabs direct the radially outward portion of the exhaust passing through the annulus radially inward, such that the mixer arrangement is configured to form a plurality of angularly stratified segments formed from alternating segments of the inward portion of the exhaust and the outward portion of the exhaust; and
wherein the second flow directing tabs have an inlet end that is radially outward of the inner liner and an outlet end that is radially inward of the inner liner.

23. The aftertreatment system of claim 22, wherein the first flow directing tabs have an inlet end that is at least radially aligned with the inner liner and an outlet end that is radially outward of the inner liner.

24. The aftertreatment system of claim 23, wherein at least one of the first flow directing tabs is configured differently than another one of the first flow directing tabs and at least one of the second flow directing tabs is configured differently than another one of the second flow directing tabs.

25. An exhaust gas mixer for interleaving portions of a flow of exhaust gas from an internal combustion engine comprising:
a plurality of first flow directing tabs;
a plurality of second flow directing tabs;
the first and second flow directing tabs arranged to circumscribe a flow axis; and
the first flow directing tabs arranged to direct radially inward exhaust flow radially outward by passing the radially inward exhaust flow only over the plurality of first flow directing tabs; and
the second flow directing tabs arranged to direct radially outer exhaust flow radially inward by passing the radially outer exhaust flow only over the plurality of second flow directing tabs;
wherein:
the first flow directing tabs have an upstream inlet end and a downstream outlet end;
the second flow directing tabs have an upstream inlet end and a downstream outlet end;
the inlet ends of the first flow directing tabs are radially inward of the outlet ends of the first flow directing tabs;
the outlet ends of the first flow directing tabs are radially outward of the inlet ends of the first flow directing tabs; and
the inlet ends of the second flow directing tabs are radially outward of the outlet ends of the second flow directing tabs.

26. The exhaust gas mixer of claim 25, wherein the outlet ends of the second flow directing tabs are radially inward of the inlet ends of the second flow directing tabs.

27. An exhaust gas mixer for interleaving portions of a flow of exhaust gas from an internal combustion engine comprising:
a plurality of first flow directing tabs;
a plurality of second flow directing tabs;
the first and second flow directing tabs arranged to circumscribe a flow axis; and
the first flow directing tabs arranged to direct radially inward exhaust flow radially outward; and
the second flow directing tabs arranged to direct radially outer exhaust flow radially inward;
wherein:
the first flow directing tabs have an upstream inlet end and a downstream outlet end;
the second flow directing tabs have an upstream inlet end and a downstream outlet end;
the inlet ends of the first flow directing tabs are radially inward of the outlet ends of the first flow directing tabs;
the outlet ends of the first flow directing tabs are radially outward of the inlet ends of the first flow directing tabs;
the inlet ends of the second flow directing tabs are radially outward of the outlet ends of the second flow directing tabs;

the inlet ends of the second flow directing tabs are radially outward of the outlet ends of the first flow directing tabs;

the inlet ends of the first flow directing tabs are radially inward of the inlet ends of the second flow directing tabs; and the outlet ends of the first flow directing tabs are radially outward of the outlet tends of the second flow directing tabs.

28. An exhaust gas mixer for interleaving portions of a flow of exhaust gas from an internal combustion engine comprising:

a plurality of first flow directing tabs;

a plurality of second flow directing tabs;

the first and second flow directing tabs arranged to circumscribe a flow axis; and the first flow directing tabs arranged to direct radially inward exhaust flow radially outward by passing the radially inward exhaust flow only over the plurality of first flow directing tabs; and the second flow directing tabs arranged to direct radially outer exhaust flow radially inward by passing the radially outer exhaust flow only over the plurality of second flow directing tabs; and wherein:

the first flow directing tabs have an upstream inlet end and a downstream outlet end;

the second flow directing tabs have an upstream inlet end and a downstream outlet end; and the inlet ends of the first flow directing tabs are radially inward of the outlet ends of the first flow directing tabs.

\* \* \* \* \*